United States Patent
Kobana et al.

(10) Patent No.: US 9,505,411 B2
(45) Date of Patent: Nov. 29, 2016

(54) DRIVE ASSIST DEVICE

(75) Inventors: Masumi Kobana, Fuji (JP); Shinichi Nagata, Yokohama (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/408,367

(22) PCT Filed: Jul. 24, 2012

(86) PCT No.: PCT/JP2012/068726
§ 371 (c)(1),
(2), (4) Date: Dec. 16, 2014

(87) PCT Pub. No.: WO2014/016910
PCT Pub. Date: Jan. 30, 2014

(65) Prior Publication Data
US 2015/0191176 A1 Jul. 9, 2015

(51) Int. Cl.
*B60W 40/08* (2012.01)
*A61B 5/18* (2006.01)
(Continued)

(52) U.S. Cl.
CPC .............. *B60W 40/08* (2013.01); *B60K 28/06* (2013.01); *B60W 50/12* (2013.01);
(Continued)

(58) Field of Classification Search
CPC ........ B60W 40/08; A61B 5/18; B60T 7/042; B60T 7/22; B60K 31/0008; G06T 13/40; G01S 13/867; G08G 1/017; G08C 23/04
USPC ............ 701/70, 2, 301; 600/300; 303/113.1; 340/435, 901; 345/474; 342/27
See application file for complete search history.

(56) References Cited

U.S. PATENT DOCUMENTS 8,725,311 B1  5/2014  Breed
2002/0130550 A1*  9/2002  Roden ............... B60T 7/042
                                            303/113.1
(Continued)

FOREIGN PATENT DOCUMENTS

JP      6107031 A     4/1994
JP    200363373 A     3/2003
(Continued)

OTHER PUBLICATIONS

Communication dated Nov. 4, 2015 from the U.S. Patent and Trademark Office in counterpart U.S. Appl. No. 14/408,359.
(Continued)

*Primary Examiner* — Yuri Kan
(74) *Attorney, Agent, or Firm* — Sughrue Mion, PLLC

(57) ABSTRACT

A drive assist device includes a driver state detection unit that outputs an emergency evacuation start signal, an consent confirmation unit that inquires of the driver, whether or not emergency evacuation control to stop a vehicle at a safe position regardless of a driving operation of the driver is permitted and receives a reply with respect to the inquiry from the driver, and a control unit that performs the emergency evacuation control when the reply which permits the performing of the emergency evacuation control is received from the driver by the consent confirmation unit. The control unit alleviates conditions for performing a preventive drive assist in which the risk for the traveling of the vehicle is avoided during a period from the time of receiving the emergency evacuation start signal to the time of receiving the reply of permitting the performing of the control by the consent confirmation unit.

12 Claims, 19 Drawing Sheets

(51) Int. Cl.
*B60W 50/12* (2012.01)
*B60K 28/06* (2006.01)
*B60W 50/00* (2006.01)
*B60W 50/14* (2012.01)

(52) U.S. Cl.
CPC ............... *B60W 2040/0818* (2013.01); *B60W 2040/0872* (2013.01); *B60W 2050/0074* (2013.01); *B60W 2050/143* (2013.01); *B60W 2520/125* (2013.01); *B60W 2540/04* (2013.01); *B60W 2540/18* (2013.01); *B60W 2540/22* (2013.01); *B60W 2540/26* (2013.01)

(56) References Cited

U.S. PATENT DOCUMENTS

| | | | | |
|---|---|---|---|---|
| 2004/0090320 | A1* | 5/2004 | Suzuki | B60K 31/0008 340/435 |
| 2005/0261806 | A1* | 11/2005 | Canie | G08C 23/04 701/2 |
| 2008/0281521 | A1* | 11/2008 | Shirato | B60T 7/22 701/301 |
| 2010/0073194 | A1* | 3/2010 | Ghazarian | G08G 1/017 340/901 |
| 2010/0318271 | A1 | 12/2010 | Nishide et al. | |
| 2011/0313259 | A1* | 12/2011 | Hatakeyama | A61B 5/18 600/300 |
| 2012/0226423 | A1* | 9/2012 | Sekiguchi | B60T 7/22 701/70 |
| 2012/0283927 | A1* | 11/2012 | Reinisch | B60T 7/22 701/70 |
| 2013/0235047 | A1* | 9/2013 | Xia | G06T 13/40 345/474 |
| 2014/0222286 | A1 | 8/2014 | Chundrlik, Jr. et al. | |
| 2014/0333467 | A1* | 11/2014 | Inomata | G01S 13/867 342/27 |
| 2015/0203126 | A1 | 7/2015 | Kobana | |

FOREIGN PATENT DOCUMENTS

| | | |
|---|---|---|
| JP | 2006-224819 A | 8/2006 |
| JP | 2007331652 A | 12/2007 |
| JP | 2010-20637 A | 1/2010 |
| JP | 2010-36656 A | 2/2010 |
| JP | 2010-286096 A | 12/2010 |
| JP | 2011-238130 A | 11/2011 |

OTHER PUBLICATIONS

Communication from the United States Patent and Trademark Office issued May 26, 2016 in U.S. Appl. No. 14/408,359.

* cited by examiner

Fig.3

| ENVIRONMENT | DRIVING OPERATION | | | | | | |
|---|---|---|---|---|---|---|---|
| | BRAKE | ACCELERATION | STEERING | DRIVE ASSIST SWITCH OFF | PARKING BRAKE | SHIFT | BLINK HAZARD LIGHT |
| IN INTERSECTION | ○ | ○ | ○ | × | × | × | △ |
| NEAR INTERSECTION | ○ | ○ | ○ | × | △ | △ | △ |
| SINGLE ROAD | ○ | ○ | ○ | × | ○ | ○ | △ |

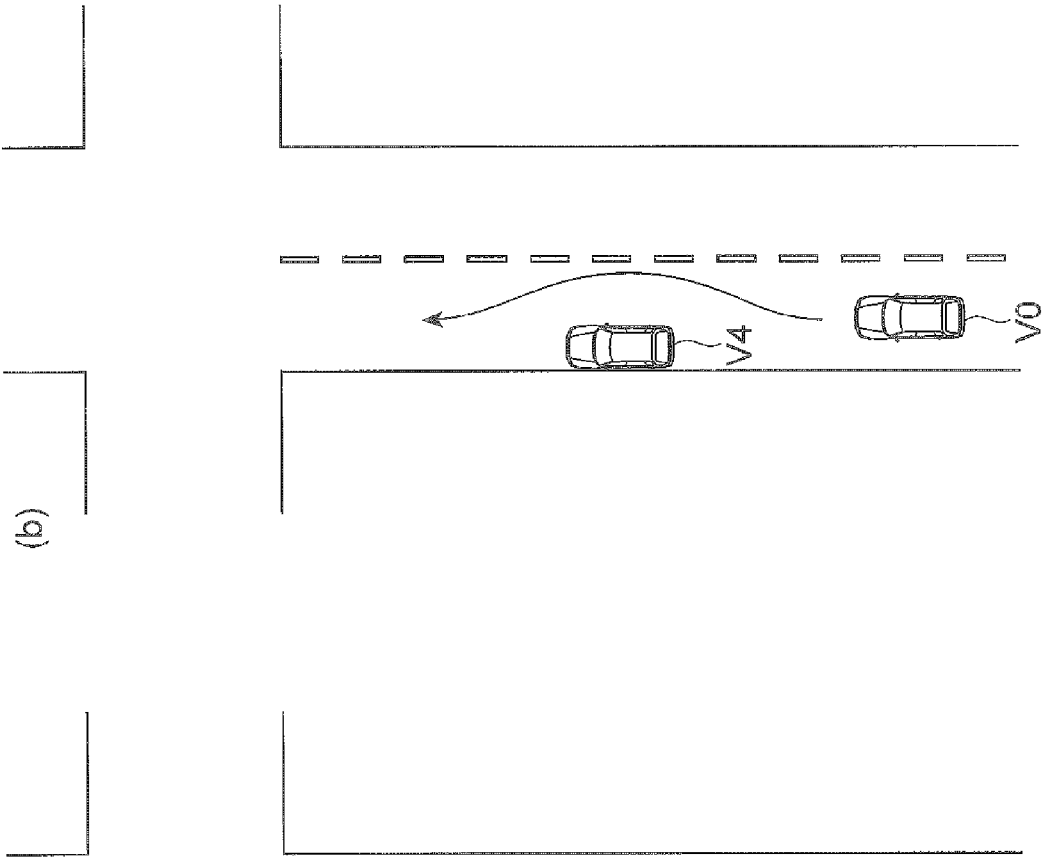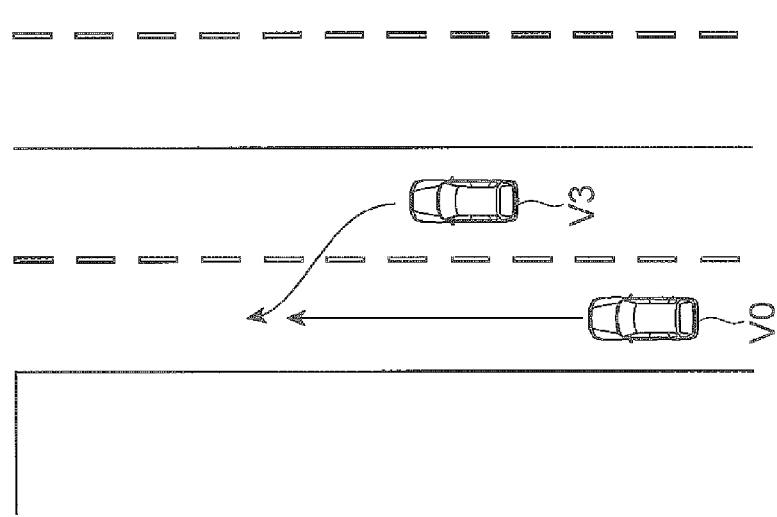
Fig. 8

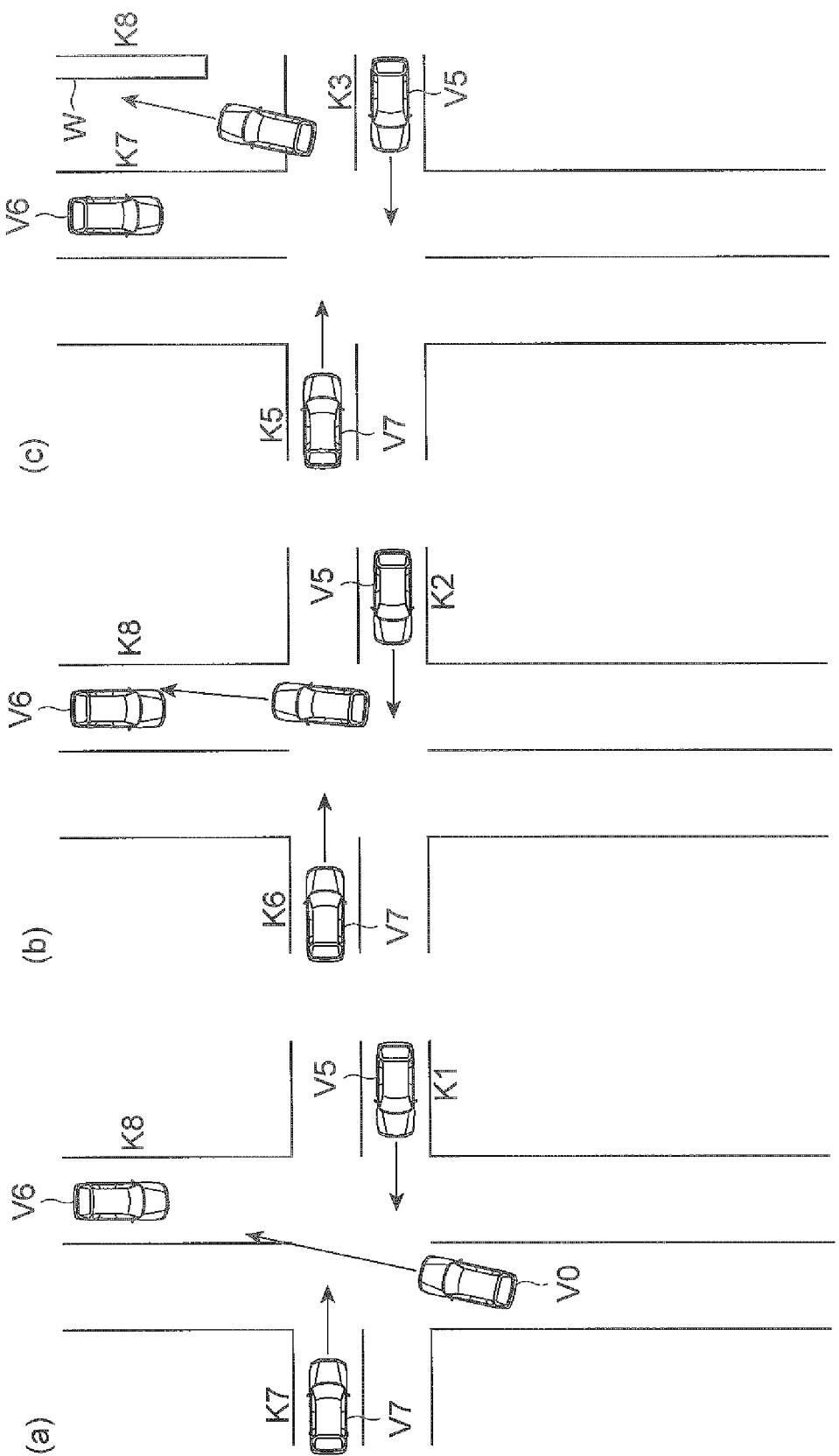

Fig.10

| RISK LEVEL | FORMS OF NOTIFICATIONS |
|---|---|
| LARGE | NOTIFY TO ALL AROUND SUCH AS FRONT/REAR DIRECTION, FACING DIRECTION, REAR SIDE DIRECTION, INTERSECTION SIDE<br><br>　・PATROL LAMP, SOUND, OR THE LIKE<br>　・BLINK HAZARD LAMP+BRAKE LAMP, OR THE LIKE |
| MEDIUM | NOTIFY TO FRONT/REAR DIRECTION, REAR SIDE DIRECTION, FACING, OR INTERSECTION SIDE<br><br>FRONT/ REAR DIRECTION<br>　・BLIK HAZARD LAMP+BRAKE LAMP, OR THE LIKE<br>FACING DIRECTION<br>　・BLINK HIGH BEAM, OR THE LIKE<br>INTERSECTION SIDE<br>　・PATROL LAMP, SOUND, OR THE LIKE |
| SMALL | NOTIFY TO REAR DIRECTION, REAR SIDE DIRECTION<br><br>　・BLINK BRAKE LAMP, OR THE LIKE |

Fig.13
(a)
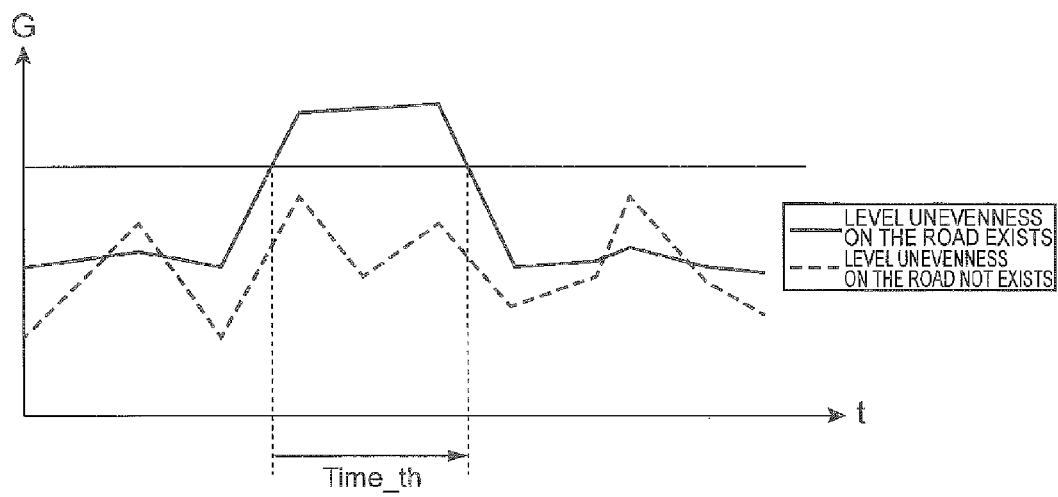
(b)
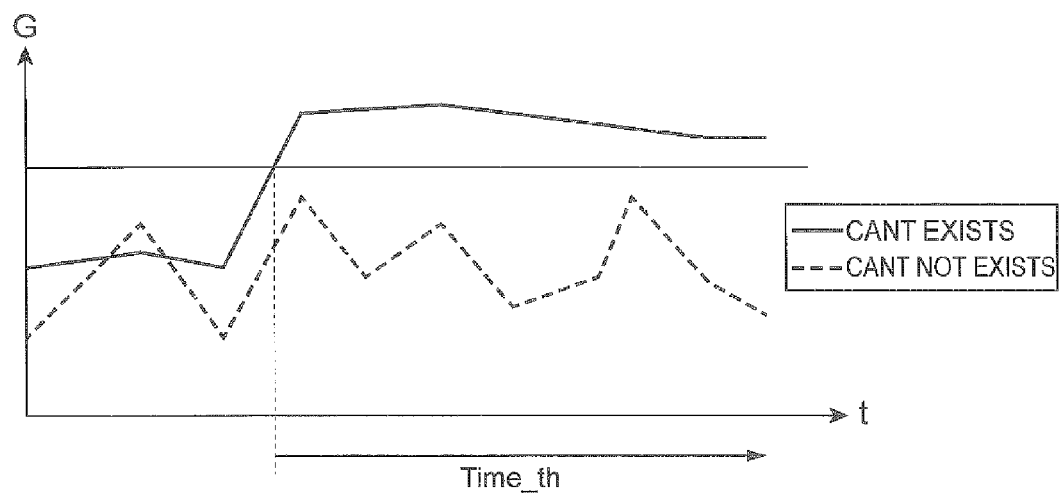

Fig.14
(a)
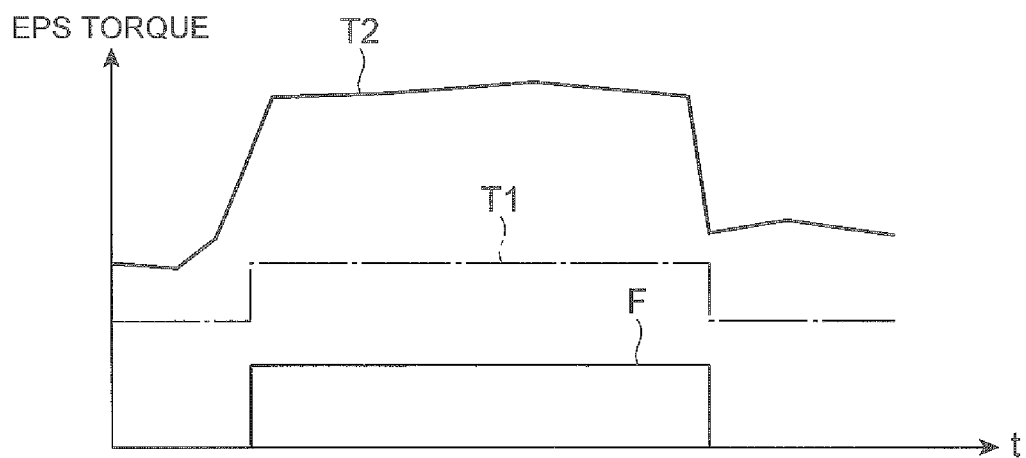
(b)
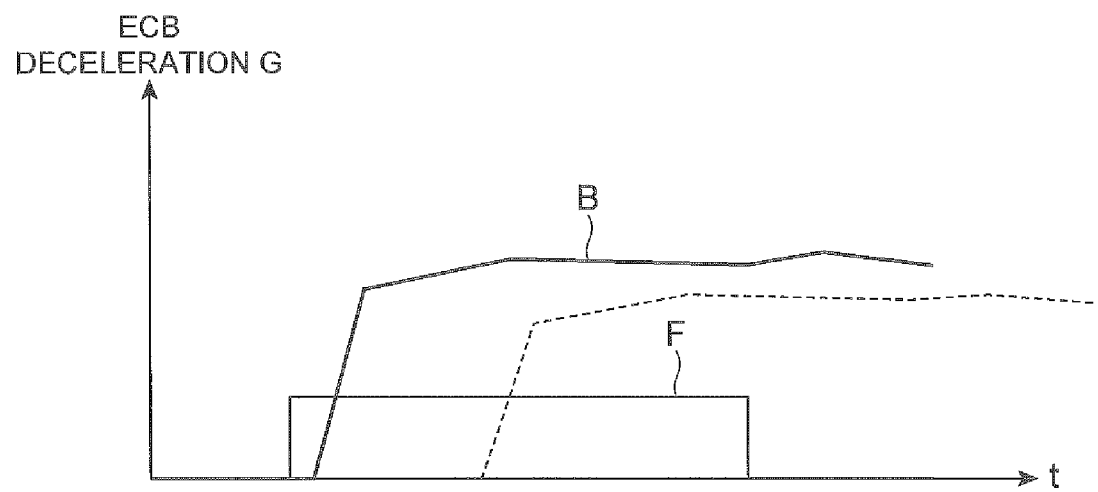

Fig.18
(a) VSC RELEASE SW
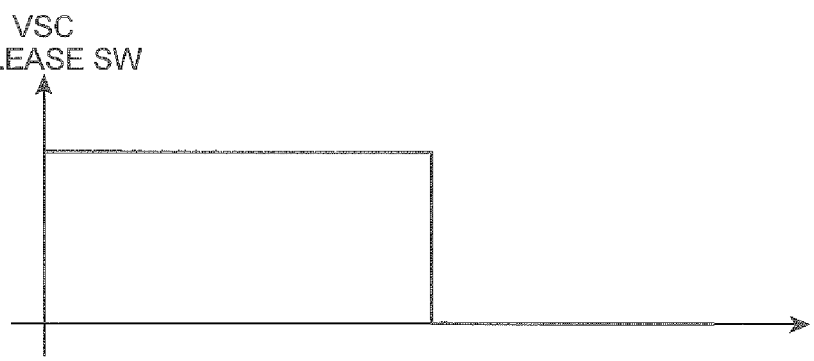
(b) CURVE R
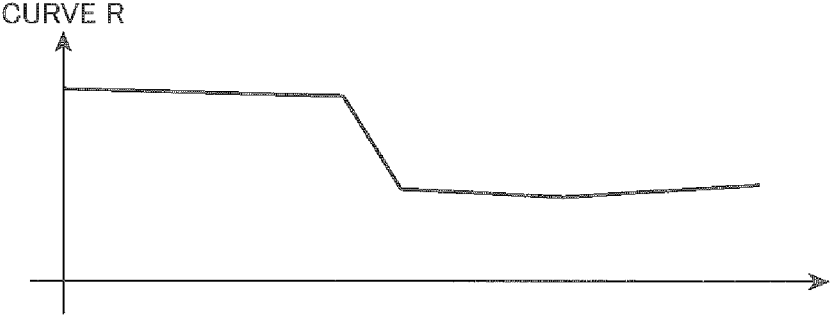
(c) LATERAL G
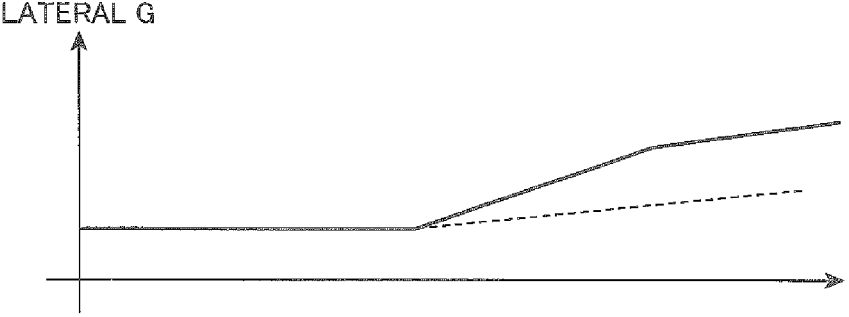
(d) YAW RATE
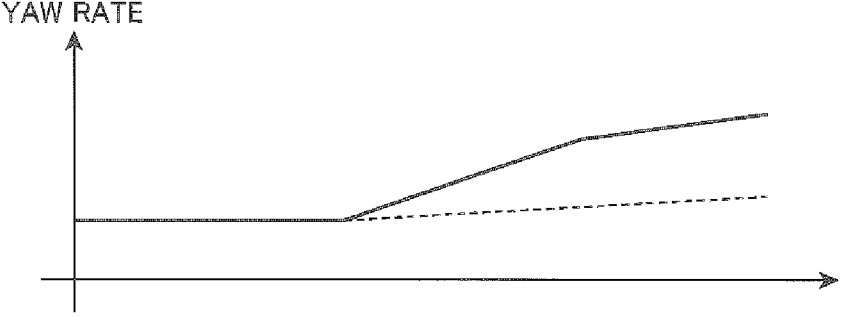

Fig.19
(a) PCS RELEASE SW
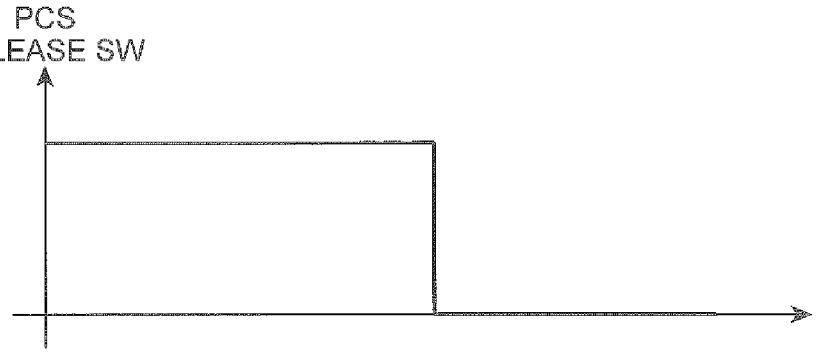
(b) TTC TO PRECEDING VEHICLE
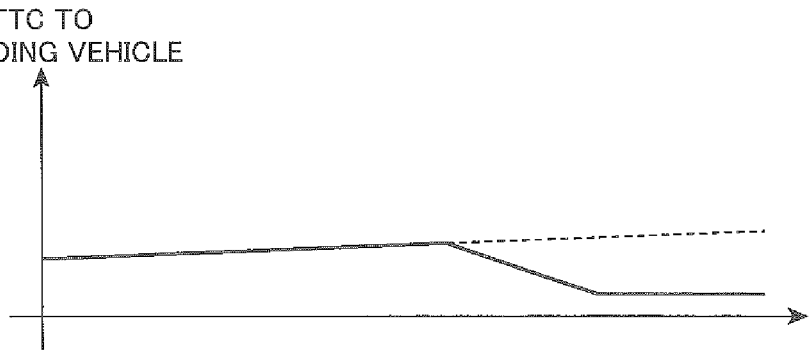
(c) DISTANCE TO PRECEDING VEHICLE
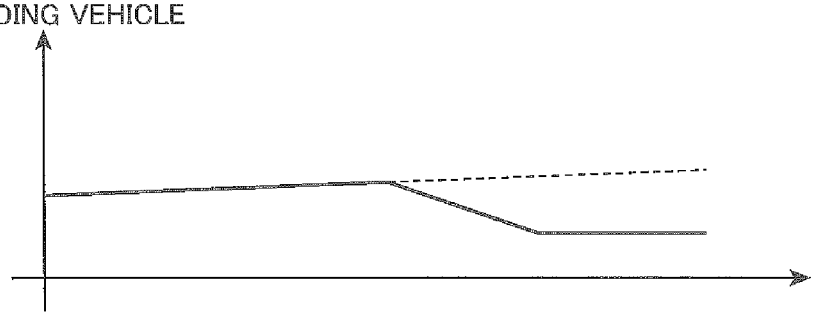

DRIVE ASSIST DEVICE

CROSS REFERENCE TO RELATED APPLICATIONS

This application is a National Stage of International Application No. PCT/JP2012/068726 filed Jul. 24, 2012, the contents of all of which are incorporated herein by reference in their entirety.

TECHNICAL FIELD

The present invention relates to a drive assist device for assisting the driving of a driver.

BACKGROUND ART

A device is known, which enforces stopping of a vehicle at a place where the vehicle does not interfere with the traveling of other vehicles when a driver's consciousness is detected to be diminished. For example, in Patent Literature 1 below, a device is disclosed, in which, when the diminished consciousness of the driver is detected during driving, a surrounding road situation ahead is detected, a target stopping position is determined, and the vehicle is automatically driven to the target stopping position by a steering control and a brake control, and then, emergency evacuation of the vehicle is caused.

CITATION LIST

Patent Literature

[Patent Literature 1] Japanese Unexamined Patent Application Publication No. 2007-331652

SUMMARY OF INVENTION

Technical Problem

As disclosed in Patent Literature 1, in an emergency evacuation of a vehicle, performing an emergency evacuation control under a condition of obtaining a consent with respect to the performing of the emergency evacuation control from a driver can be considered. However, in this case, there is a problem in that the driver may perform a dangerous operation such as an erroneous operation during a period from the time of the driver's consciousness being diminished to the time of receiving the consent from the driver. In such a case, there is a possibility that a behavior of the vehicle by a driving operation may give discomfort to the drivers of surrounding vehicles.

Therefore, the present invention has an object to prevent the behavior of the vehicle during the period of obtaining the driver's consent on performing the emergency evacuation control from giving discomfort to the drivers of the surrounding vehicles.

Solution to Problem

A drive assist device according to the present invention includes: a start signal output unit that outputs a control start signal; a consent confirmation unit that inquires of a driver, when receiving the control start signal from the start signal output unit, whether the driver consents to performing of an emergency evacuation control for stopping a vehicle at a safe position regardless of a driving operation of the driver, and receives a reply to the inquiry from the driver; and a control unit that performs the emergency evacuation control when the consent confirmation unit receive the reply permitting the performing of the emergency evacuation control from the driver. During a period from the time of receiving the control start signal from the start signal output unit to the time of receiving the reply of permitting the performing of the control from the driver by the consent confirmation unit, the control unit alleviates conditions for performing a preventive drive assist that assists the traveling of the vehicle.

In the drive assist device in the present invention, during a period from the time of receiving the control start signal from the start signal output unit to the time of receiving the answer of permitting the performing of the control from the driver by a reply reception unit, the conditions for performing a preventive drive assist that assists the traveling of the vehicle are alleviated, and the preventive drive assist can easily be performed. Accordingly, it is possible to prevent the behavior of the vehicle due to an erroneous operation by the driver from giving discomfort to the drivers of surrounding vehicles during the period of a time from receiving the control start signal to a time obtaining the driver's agreement on performing the emergency evacuation control.

In addition, the drive assist device according to the present invention may further include: a traveling information acquisition unit that acquires traveling information of the vehicle; an environmental information acquisition unit that acquires environmental information regarding an environment surrounding the vehicle; and a risk level acquisition unit that acquires a risk level for the vehicle colliding with an obstacle base on at least one of the traveling information and the environmental information. when the risk level is higher than a predetermined risk level, the control unit may alleviate the conditions for performing the preventive drive assist.

According to such a configuration, the conditions for performing the preventive drive assist are alleviated in a case where the risk level for the vehicle colliding with an obstacle is high. Therefore, during the period of a time from receiving the control start signal to a time obtaining the driver's agreement on performing the emergency evacuation control, it is possible to reliably prevent the behavior of the vehicle due to an erroneous operation by the driver from giving discomfort to the drivers of the surrounding vehicles during the period of obtaining the driver's agreement from giving discomfort to the drivers of the surrounding vehicles.

In addition, in the drive assist device according to the present invention, the control unit may alleviate the conditions for performing the preventive drive assist as the risk level increases.

According to such a configuration, as the risk level for the vehicle colliding with an obstacle increases, the preventive drive assist can easily be performed. Therefore, it is possible to reliably prevent the behavior of the vehicle due to an erroneous operation by the driver from giving discomfort to the drivers of the surrounding vehicles.

In addition, in the drive assist device according to the present invention, in a case where the vehicle is positioned in an intersection, the risk level acquisition unit may set the risk level higher than that in a case where the vehicle is traveling on a single road.

According to such a configuration, the risk level at an intersection where many obstacles exit is set high. Therefore, it is possible to appropriately set the risk level.

In addition, in the drive assist device according to the present invention, in a case where the vehicle is positioned near intersection, the risk level acquisition unit may set the risk level higher than that in a case where the vehicle is traveling on a single road.

According to such a configuration, the risk level near intersection where more obstacles exit than on a single road is set high. Therefore, it is possible to appropriately set the risk level.

In addition, in the drive assist device according to the present invention, in a case where an steering amount of a steering wheel by the driver is equal to or smaller than a predetermined steering amount, and lateral acceleration of the vehicle is equal to or larger than a predetermined lateral acceleration or an amount of change in yaw rate is equal to higher than a predetermined amount of change in yaw rate, the risk level acquisition unit sets the risk level higher than that in a case where the steering amount of steering wheel by the driver is larger than the predetermined steering amount, or in a case where lateral acceleration of the vehicle is smaller than a predetermined lateral acceleration and an amount of change in a yaw rate is smaller than a predetermined amount of change in yaw rate.

In a case where it is difficult to drive the vehicle normally due to diminished consciousness of the driver, the amount of steering is considered to be decreased. In this case, if the amount of change in lateral acceleration or in yaw rate increases due to an external disturbance such as a level unevenness on the road or a cant, there is a possibility that the vehicle may leave the traveling road. According to such a configuration, the risk level is set high in a case where the amount of steering is small and the amount of change in lateral acceleration of the vehicle and in yaw rate are small. Therefore, it is possible to appropriately set the risk level.

In addition, in the drive assist device according to the present invention, the start signal output unit may be a switch operated by the driver.

According to such a configuration, it is possible to cause the emergency evacuation control to be performed according to the driver's intention.

In addition, the drive assist device according to the present invention may further include an erroneous operation determination unit that determines whether or not a driving operation of the driver is an erroneous operation. When it is determined that the operation of the driver is an erroneous operation by the erroneous operation determination unit, the control unit may alleviate the conditions for performing the preventive drive assist.

According to such a configuration, when it is determined that the operation of the driver is an erroneous operation, the conditions for performing the preventive drive assist are alleviated. Therefore, it is possible to reliably prevent the behavior of the vehicle due to the erroneous operation by the driver from giving discomfort to the drivers of the surrounding vehicles.

In addition, in the drive assist device according to the present invention, when a variation of a steering angle of the driver's steering over time is equal to or larger than a predetermined variation of the steering angle over time, the erroneous operation determination unit may determine the steering operation by the driver as an erroneous operation.

According to such a configuration, it is possible to determine a rapid steering operation which is considered not to be performed by the driver in an ordinary situation as an erroneous operation.

In addition, in the drive assist device according to the present invention, when a variation of a throttle opening by the driver over time is equal to or larger than a predetermined variation of a throttle opening over time, the erroneous operation determination unit may determine the acceleration operation by the driver as an erroneous operation.

According to such a configuration, it is possible to determine a rapid acceleration operation which is considered not to be performed by the driver in an ordinary situation as an erroneous operation.

In addition, in the drive assist device according to the present invention, the erroneous operation determination unit may determine whether or not a starting operation of the preventive drive assist by the driver is an erroneous operation.

Among the drive assists, there is a dangerous assist that is performed when the driver cannot drive the vehicle normally. According to the configuration, it is determined whether or not the starting operation of the drive assist by the driver is an erroneous operation. Therefore, it is possible to detect the operation of the dangerous drive assist.

In addition, in the drive assist device according to the present invention, the erroneous operation determination unit may determine whether or not a release operation of the preventive drive assist by the driver is an erroneous operation.

Among the drive assists, there is also a dangerous assist that is released in a case where the driver cannot drive the vehicle normally. According to the configuration, it is determined whether or not the release operation of the drive assist by the driver is an erroneous operation. Therefore, it is possible to detect the operation of the dangerous drive assist.

Advantageous Effects of Invention

According to an aspect of the present invention, it is possible to prevent the behavior of the vehicle during the period of obtaining the driver's consent on performing the emergency evacuation control from giving discomfort to the drivers of surrounding vehicles.

BRIEF DESCRIPTION OF DRAWINGS

FIG. 3 is a diagram illustrating an example of a determination map.

FIG. 8 is a diagram for explaining another example of a method of calculating the proximity degree parameter r.

FIG. 9 is a diagram for explaining an example of a method of calculating an obstacle parameter k.

FIG. 10 is a diagram for explaining a notification manner corresponding to a degree of risk.

FIG. 13($a$) is a diagram for explaining a method of detecting a level unevenness on the road surface, and FIG. 13(B) is a diagram for explaining a method of detecting a cant on the road surface.

FIG. 14(A) is a diagram explaining a steering assist control performed in a case where a level unevenness exists on the road surface, and FIG. 14(b) is a diagram explaining a deceleration control performed in a case where a level unevenness exists on the road surface.

FIG. 18 is a diagram illustrating a trend of lateral acceleration and a yaw rate of the host vehicle in a case where a release operation of VSC is recognized, and illustrating a trend of lateral acceleration and a yaw rate of the host vehicle in a case where the release operation of VSC is invalidated.

FIG. 19 is a diagram illustrating a trend of a preceding vehicle TTC and distance to the preceding vehicle of the host vehicle in a case where a release operation of a PCS is recognized, and illustrating a trend of driving force of the host vehicle in a case where the release operation of a PCS is invalidated.

DESCRIPTION OF EMBODIMENTS

Figure 1:
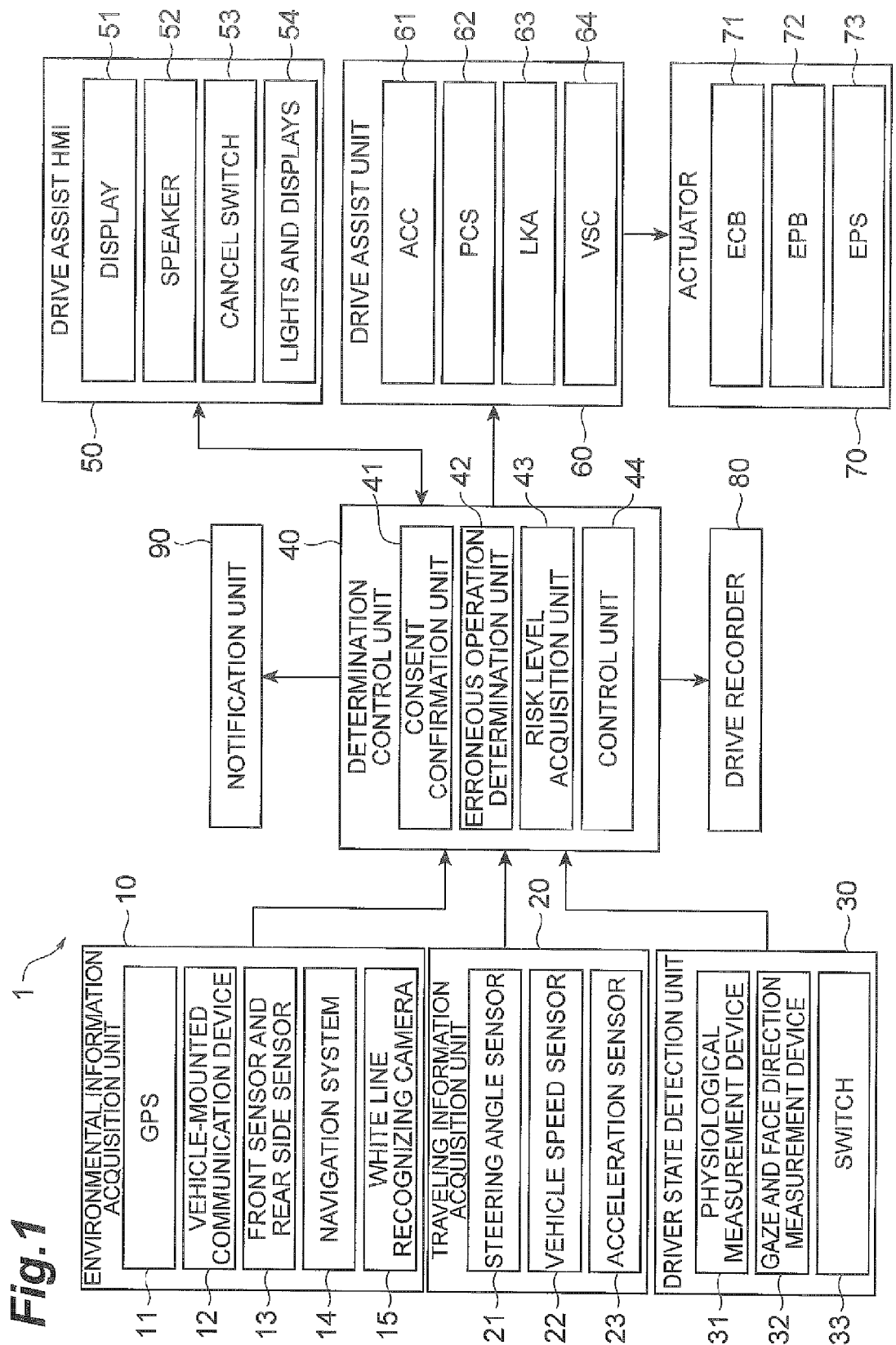
FIG. 1 is a block configuration diagram of a drive assist device in the present invention.

Hereinafter, preferred embodiments of the present invention will be described in detail referring to the drawings. In the description below, the same or equivalent elements are referred to by the same reference signs and the description thereof will not be repeated.

First Embodiment

FIG. 1 is a block configuration diagram of functions of a drive assist device 1 in the first embodiment of the present invention. As illustrated in FIG. 1, the drive assist device 1 includes an environmental information acquisition unit 10, a traveling information acquisition unit 20, a driver state detection unit (start signal output unit) 30, a determination control unit 40, a drive assist HMI (Human Machine Interface) 50, a drive assist unit 60, an actuator 70, a drive recorder 80, and a notification unit 90. The drive assist device 1 is mounted on the host vehicle.

The environmental information acquisition unit 10 includes a GPS 11, a vehicle-mounted communication device 12, a front sensor and rear side sensor 13, a navigation system 14, and a white line recognizing camera 15. The global positioning system (GPS) 11 is means for receiving signals from a plurality of GPS satellites by a GPS receiver, and measuring a position of the host vehicle from the difference between each received signal. The vehicle-mounted communication device 12 is a communication device that performs a vehicle-to-vehicle communication between the host vehicle and another vehicle, and a road-to-vehicle communication between the host vehicle and road side infrastructure such as an optical beacon. The front sensor and rear side sensor 13 is means for detecting a position and a moving speed of obstacles such as a pedestrian around the vehicle, a bicycle, a motor cycle, facilities on the vehicle or on the road side, and, for example, is a millimeter-wave radar or an ultrasonic sonar. The navigation system 14 is means for performing a route guidance using position information of the host vehicle acquired by the GPS 11 and map information stored in a predetermined storage unit. The white line recognizing camera 15 is means for recognizing white lines of a lane on which the host vehicle is traveling using imaging means mounted on the host vehicle. The environmental information acquisition unit 10 outputs environmental information regarding the environment surrounding the vehicle detected by the GPS 11, the vehicle-mounted communication device 12, the front sensor and rear side sensor 13, the navigation system 14, and the white line recognizing camera 15, to the determination control unit 40.

The traveling information acquisition unit 20 includes a steering angle sensor 21, a vehicle speed sensor 22, and an acceleration sensor 23. The steering angle sensor 21 is a sensor for detecting a steering angle of the host vehicle. The vehicle speed sensor 22 is a sensor for detecting a vehicle speed of the host vehicle by detecting a rotation speed of the vehicle axle. The acceleration sensor 23 is a sensor for detecting acceleration of the host vehicle in a front-back direction or in a lateral direction. The traveling information acquisition unit 20 outputs the traveling information detected by the steering angle sensor 21, the vehicle speed sensor 22, and the acceleration sensor 23, to the determination control unit 40.

The driver state detection unit 30 is means for recognizing a state of the driver of the host vehicle. The driver state detection unit 30 detects whether or not the driver of the host vehicle is in a state of diminished consciousness due to a seizure or a snooze. The driver state detection unit 30 includes a physiological measurement device (consciousness level acquisition unit) 31, a gaze and face direction measurement device (consciousness level acquisition unit) 32, and a switch 33. The physiological measurement device 31 is means for detecting the state of the driver by measuring a heart rate, a pulse rate and a respiratory rhythm of the driver of the host vehicle. The gaze and face direction measurement device 32 is means for detecting a gaze and face direction of the driver by imaging a head of the driver by a camera and detecting a movement of the eyeballs and the face. In a case where the physiological measurement device 31 or the gaze and face direction measurement device 32 detects that the driver is in the state of diminished consciousness, the driver state detection unit 30 outputs an emergency evacuation start signal (the control start signal) indicating a start of an emergency control processing, to the determination control unit 40. The driver state detection unit 30 may detect the state of the driver by any arbitrary method such as a case of detecting a sway of the steering of the driver.

The switch 33 is a switch for starting an emergency evacuation control by the drive assist device 1, and is operated by the driver. When the switch 33 is pressed by the driver to be in ON state, the driver state detection unit 30 outputs the emergency evacuation start signal indicating the starting of the emergency control processing, to the determination control unit 40. The driver state detection unit 30 may output the emergency evacuation start signal after acquiring an intention of the driver to perform the emergency evacuation control by any arbitrary method such as a case of detecting a voice of a driver intending to perform the emergency evacuation by a microphone. The driver state detection unit 30 configures a start signal output unit in Claims attached hereto.

The determination control unit 40 integrally controls the drive assist device 1 and is means for performing an operation of an emergency evacuation device and a preventive drive assist. The determination control unit 40 includes a consent confirmation unit 41, an erroneous operation determination unit 42, a risk level acquisition unit 43, and a control unit 44. The consent confirmation unit 41, when receiving the emergency evacuation start signal from the driver state detection unit 30, outputs an inquiry signal inquiring of the driver whether or not to perform the emergency evacuation control, to the drive assist HMI 50. The erroneous operation determination unit 42 is means for determining whether the driving operation by the driver is an erroneous operation or not based on the environmental information output from the acquisition unit 10 and the traveling information output from the environmental information acquisition unit 10 and the traveling information acquisition unit 20. The risk level acquisition unit 43 is means for acquiring a risk level for the host vehicle colliding with obstacles such as another vehicle or a structure based on the environmental information output from the environmental information acquisition unit 10 and the traveling information output from the traveling information acquisition unit 20. The control unit 44 is means for performing the emergency evacuation control in a case where an answer which permits performing the emergency evacuation control is received from the driver. The emergency evacuation control is a control of causing the vehicle to stop at a safe position regardless of the driver's driving operation. In addition, the control unit 44 alleviates a condition for performing the preventive drive assist that assists the traveling of the vehicle during a period (hereafter, referred to as "waiting period") from the time of receiving the emergency evacuation start signal from the driver state detection unit 30 to the time of receiving the answer of permitting the performing of the emergency evacuation control from the driver.

The drive assist HMI 50 includes a display 51, a speaker 52, a cancel switch 53, and lights and displays 54. The drive assist HMI 50, when receiving the inquiry signal from the determination control unit 40, the emergency evacuation control to be performed is notified to the driver by an image of the display 51, a voice of speaker 52, or the lights and displays 54, and inquires of whether the emergency evacuation control is permitted to be performed or not. When the driver reply with the consent (agreement) to perform the emergency evacuation control by pressing down the switch 33, the drive assist HMI 50 outputs a permit signal indicating the permission to perform the emergency evacuation control, to the determination control unit 40. In addition, when the cancel switch 53 is operated by the driver, the performing of the emergency evacuation control is cancelled. The drive assist HMI 50 may output the permit signal to the determination control unit 40 after being inquired of whether the emergency evacuation control is permitted to be performed or not, for example, in a case where the consent on performing the emergency evacuation control is answered by a voice, or in a case where there is no answer from the driver within a predetermined time frame. Furthermore, the drive assist HMI 50 may cancel the performing of the emergency evacuation control after being inquired of whether the emergency evacuation control is permitted to be performed or not, and in a case where the driver continuously presses down the switch 33 multiple times. The consent confirmation unit 41 and the drive assist HMI 50 configure a consent confirmation unit in Claims attached hereto.

The drive assist unit 60 is means for performing the preventive drive assist that assists the traveling of the vehicle based on the control signal from the determination processing ECU 40. The drive assist unit 60 includes an adaptive cruise control (ACC) 61, a pre-crush safety (PCS) 62, a lane keeping assist (LKA) 63, and a vehicle stability control (VSC) 64. The ACC 61 functions as a constant speed traveling control device that causes the host vehicle to travel at a predetermined speed with respect to the preceding vehicle and a vehicle-to-vehicle distance control device that causes the host vehicle to travel with following the preceding vehicle at a predetermined vehicle-to-vehicle distance. The PCS 62 functions as a collision avoidance assist device that causes the host vehicle to avoid collision with an obstacle. The LKA 63 functions as a lane keeping assist device that causes the host vehicle to travel while staying in a lane. The VSC 64 functions as a horizontal slip prevention control device that suppress the horizontal slip of the vehicle. The drive assist unit 60 drives actuators such as an electric control braking system (ECB) 71 which is the actuator 70, an electronic parking brake (EPB) 72, and an electric power steering (EPS) 73 such that those drive assists are performed.

The drive recorder 80 is means for recording a state inside of the vehicle before and after the collision. The drive recorder 80 records a state of occupants, a behavior of the driver (for example, presence or absence of inattentive driving or drowsy driving), and an operation state of the drive assist HMI 50 before and after the collision, using a camera.

The notification unit 90 is means for notifying other vehicles around the host vehicle of a danger, and physically includes a horn, hazard lights, and headlights. When receiving the emergency evacuation start signal from the driver state detection unit 30, the notification unit 90 is controlled by the control unit 40, and notifies the other vehicles around the host vehicle of a danger.

Figure 2:
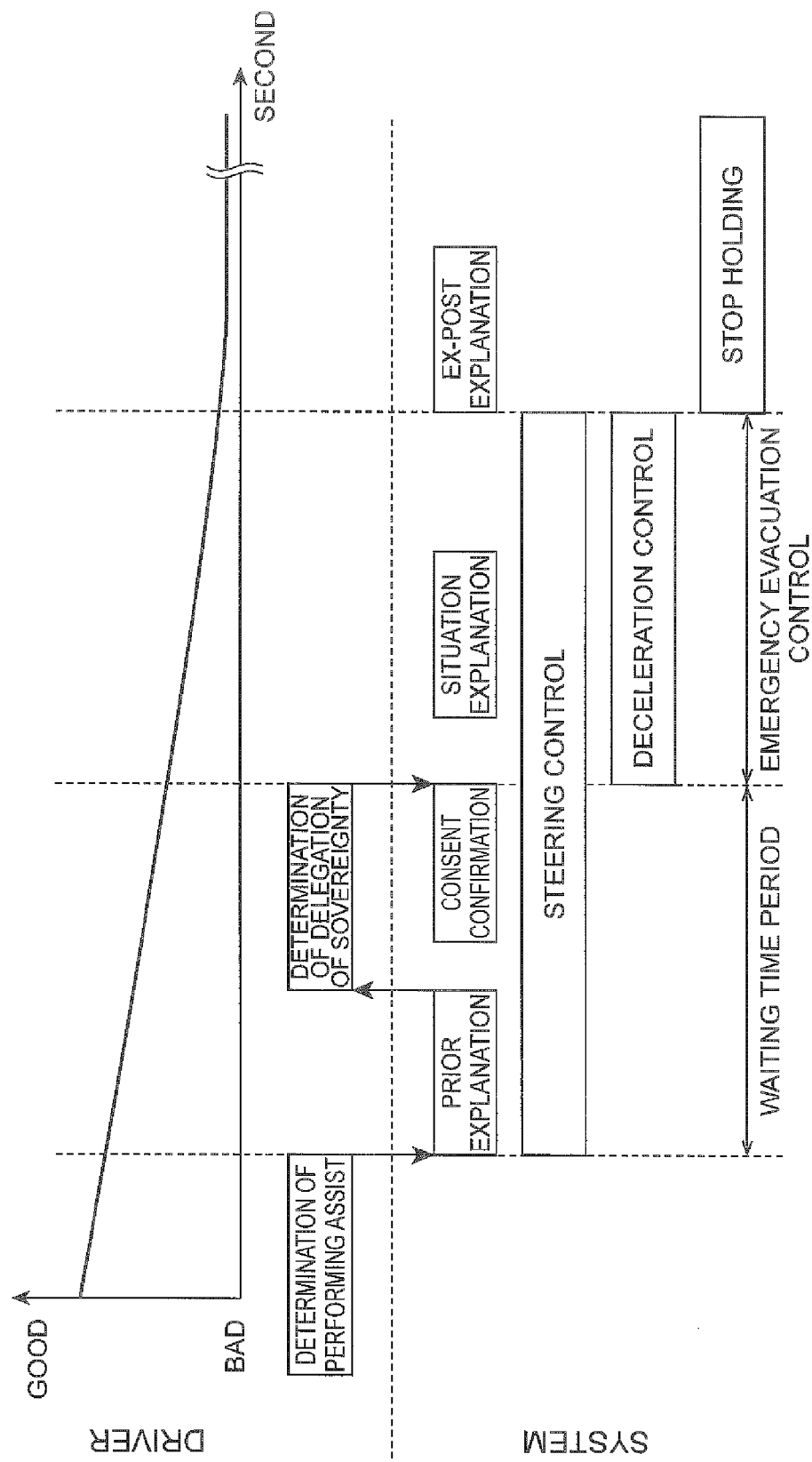
FIG. 2 is a diagram illustrating a flow until an emergency evacuation assist is performed in the drive assist device in the present invention.

Next, the preventive drive assist performed in the determination control unit 40 will be described in detail. First, in order to make it easy to understand the control by the drive assist device 1, a flow of the control by the drive assist device 1 will be described using FIG. 2. When the switch 33 is pressed down by the driver and the drive assist is determined to be performed, the drive assist device 1 explains to the driver that the emergency evacuation control is to be performed. Then, the driver determines to delegate a control of the vehicle to the device. When the drive assist device 1 confirms the delegation of the control, the emergency evacuation assist is performed. The determination control unit 40 alleviates the conditions for performing the preventive drive assist during the waiting period from the time of determination by the driver to perform the drive assist to the time of confirming the consent of the driver.

In the waiting period, the erroneous operation determination unit 42 determines whether or not the operation of the driver is an erroneous operation using a determination map illustrated in FIG. 3. The determination map illustrated in FIG. 3 is stored in advance in a predetermined storage unit in the drive assist device 1, and is a reference for determining whether or not the operation of the driver is an erroneous operation from the points of view that the driving operation of the driver is unnatural, dangerous, or poses a danger to the surroundings, from the surrounding environment. The determination map, as illustrated in FIG. 3, is stored in association with the traveling position of the host vehicle, the driving operation of the driver, and the information indicating whether or not the driving operation is appropriate at the traveling position. In the determination map illustrated in FIG. 3, "O" indicates that the operation is appropriate, "x" indicates that that the operation is inappropriate. "Δ" indicates that there is a probability of being inappropriate. For example, generally, the operation of the parking brake or operation of a shift lever of an automatic transmission vehicle in the intersection is rarely considered. Therefore, in the determination map, the operation of the "parking brake" "in the intersection" is associated with the "erroneous operation". In addition, in the waiting period in which there is a possibility of the driver being in a state of diminished consciousness, it is dangerous to perform a releasing operation of the drive assist (for example, the PCS 62 or the VSC 64) for securing the safety of the host vehicle. Therefore, in the determination map, the operation to turn OFF the switch of the drive assist is associated with the erroneous operation.

In determining whether or not the operation of the driver is the erroneous operation, the erroneous operation determination unit 42 acquires information that the host vehicle is traveling which position of an intersection, near an intersection (for example, up to 30 meters before and after an intersection), or a single road based on the environmental information output from the environmental information acquisition unit 10. A single road here indicates a traveling position except at an intersection or near an intersection. The erroneous operation determination unit 42 acquires the traveling position of the host vehicle from the environmental information, and acquires the driving operation of the driver from the traveling information. Then, the erroneous operation determination unit 42 determines whether or not the operation of the driver is an erroneous operation referring to the determination map, based on the acquired traveling position of the host vehicle and the driving operation of the driver. In a case where it is determined that the driving operation of the driver is an erroneous operation (that is, in a case where the operation corresponding to "x" in the determination map is performed), and in a case where it is determined that there is a possibility of an erroneous operation (that is, in a case where the operation corresponding to "Δ" in the determination map is performed), the erroneous operation determination unit 42 outputs a control prohibition signal that prohibits the driving operation, to the control unit 44. The control prohibition signal may be output to the control unit 44 only in a case where it is determined that the driving operation of the driver is an erroneous operation.

The control unit 44, when receiving the control prohibition signal from the erroneous operation determination unit 42, ignores the erroneous operation by the driver, and performs control such that the erroneous operation is not performed. That is, in a case where the operation of the driver is an erroneous operation, the control unit 44 prohibits an overriding by the driver. For example, in a case where the parking brake is pulled in the intersection during the waiting period, that operation is determined to be the erroneous operation, the braking operation by the parking brake not being performed by the control unit 44. On the other hand, in a case where it is determined that the operation of the driver is not the erroneous operation of the driver by the erroneous operation determination unit 42, and in a case where the control prohibition signal is not received from the erroneous operation determination unit 42, the control unit 44 performs the operation by the driver.

The erroneous operation determination unit 42 may determine that the operation of the driver is an erroneous operation by a method described below. That is, in a case where the variation of the steering angle by a driver's steering over time is equal to or larger than a predetermined variation of steering angle over time during the waiting period, the erroneous operation determination unit 42 may determine that the steering operation by the driver is an erroneous operation. In addition, in a case where the variation of the driver's throttle opening over time is equal to or larger than a predetermined variation of throttle opening over time during the waiting period, the erroneous operation determination unit 42 may determine that the acceleration operation by the driver is an erroneous operation. In this case, the control unit 44 ignores the steering operation or the acceleration operation determined as the erroneous operation, and controls the erroneous operation not to be performed.

In addition, the determination control unit 40 calculates a risk level of traveling based on the environmental information output from the environmental information acquisition unit 10 and the traveling information output from the traveling information acquisition unit 20, and the control unit 90 notifies surrounding vehicle of the risk according to the magnitude of the risk level. Here, the risk level is a level of risk for the host vehicle colliding with an obstacle such as another vehicle, in other words, the risk level is a size of influence of the operation of the driver on the surrounding vehicle. The risk level acquisition unit 43 of the determination control unit 40 calculates a risk level T using Formula (1). In Formula (1), D indicates a state level of the driver. The state level D of the driver is a value determined based on the output of the driver state detection unit 30, for example, in a case where the consciousness level of the driver is low, the state level D of the driver is set large. In a case where the consciousness level of the driver is not detected, the state level D of the driver may always be one.

$$T = (Wd \times d + Wk \times k Wr \times r + Wv \times v) \times D \quad (1)$$

d: a distance parameter determined based on the distance between the host vehicle and an intersection k: an obstacle parameter determined based on the region in which an obstacle exists r: a proximity degree parameter determined based on a proximity degree of the host vehicle and an obstacle v: a relative speed parameter determined based on the relative speed of the host vehicle and the obstacle Wd: a coefficient which is a weighting for the distance parameter d Wk: a coefficient which is a weighting for the obstacle parameter k Wr: a coefficient which is a weighting for the proximity degree parameter r Wv: a coefficient which is a weighting for the relative speed parameter v The distance parameter d and the relative speed parameter v in Formula (1) are values uniquely acquired from the output of the environmental information acquisition unit 10. That is, as the host vehicle approaches an intersection, the distance parameter d is set large. As a result, the value of the calculated risk level T increases. In addition, as the relative speed of the host vehicle and the obstacle increases, the relative speed parameter v is set large. As a result, the value of the calculated risk level T increases.

Figure 4:
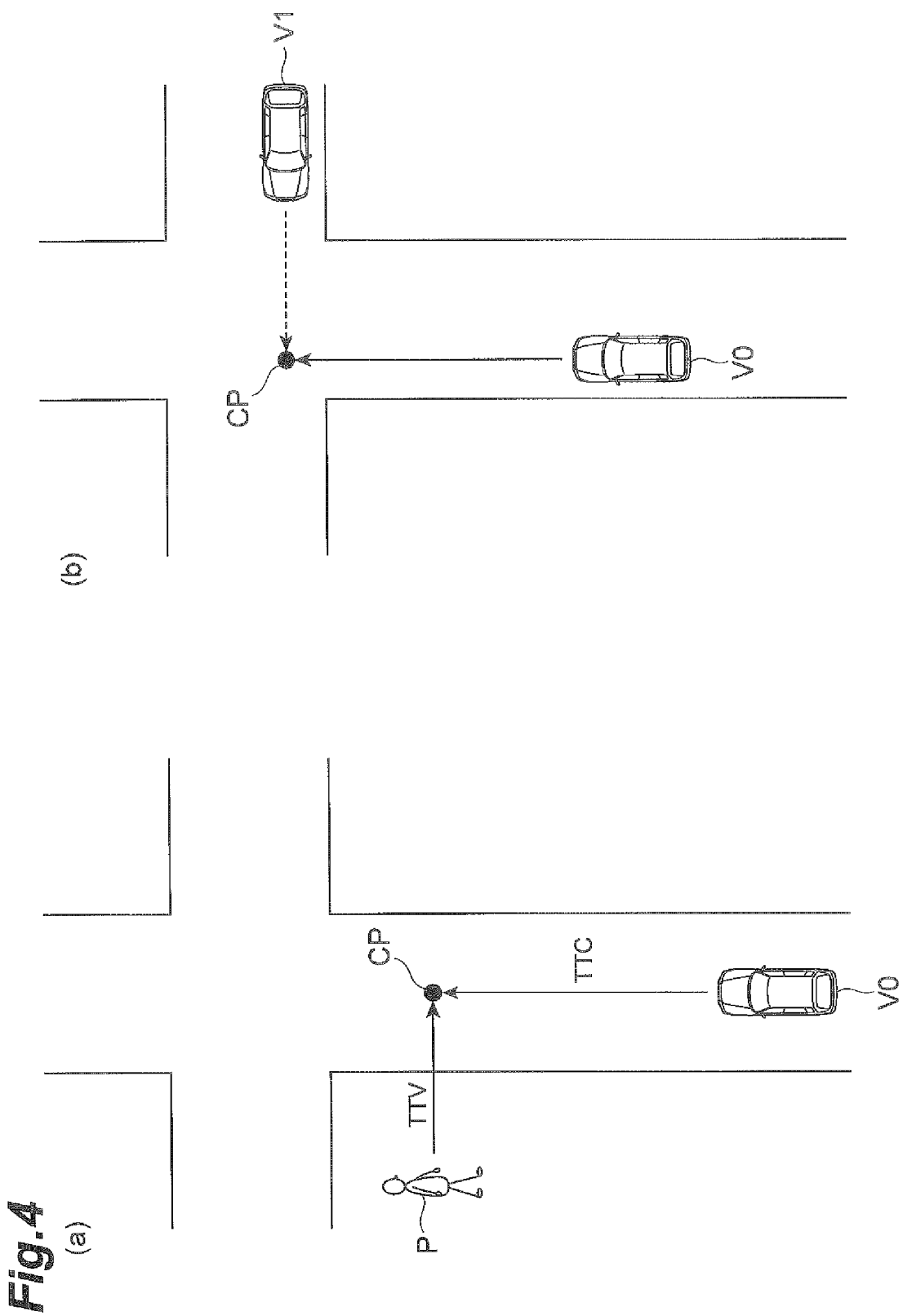
FIG. 4 is a diagram for explaining an example of a method of calculating a proximity degree parameter r.

Hereinafter, a method of calculating the proximity degree parameter r and the obstacle parameter k will be described using detailed examples. FIG. 4(a) is a diagram illustrating a scene in which a vehicle V0 that includes the drive assist device 1 toward an intersection where a pedestrian P is crossing is driving. The proximity degree parameter r is calculated using a TTC-TTV map illustrated in FIG. 5. TTC (time to collision) indicates a predicted time that the vehicle V0 will take to reach the movement line of the pedestrian P, and the TTV (time to vehicle) indicates a predicted time that the person will take to reach a movement line of the vehicle.

Figure 5:
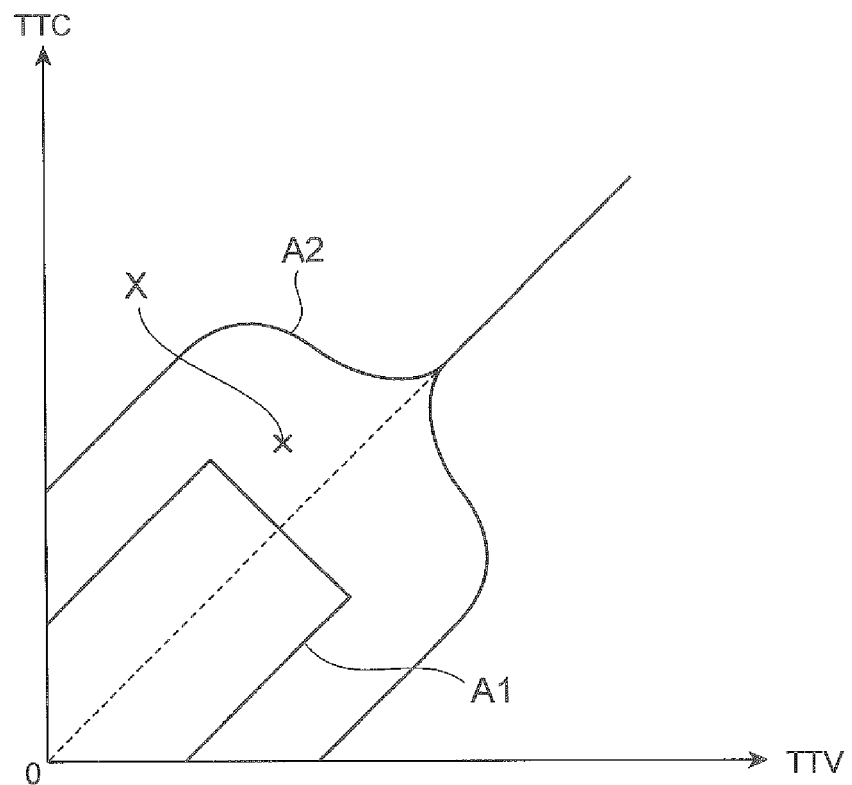
FIG. 5 is a diagram for explaining an example of a TTC-TTV map.

The risk level acquisition unit 43 plots the TTC and the TTV output from the environmental information acquisition unit 10 on the map illustrated in FIG. 5, and sets the proximity degree parameter r such that the proximity degree parameter r increases as the plotted position X approaches the origin 0. This is because as the position X approaches the origin 0, the possibility of a collision of the vehicle V0 and the pedestrian P increases. In other words, the proximity degree parameter r is determined by a degree of separation between intervention lines A1 and A2 which will be described below. Generally, in a case where the plotted position X is located within the predetermined intervention line A1, the control unit 44 determines that there is a possibility of collision of the person with the vehicle, and performs the collision avoidance control. On the other hand, during the waiting period, since there is a possibility that the vehicle V0 will depart from the travel locus which is predicted to be ordinarily taken, the control unit 44 changes the intervention lines A1 and A2, and alleviates a starting condition which is the reference for performing the collision avoidance control.

As illustrated in FIG. 4(b), even in a scene in which the host vehicle V0 is traveling toward the intersection where a vehicle V1 is entering, the risk level acquisition unit 43 can calculate the TTC of the vehicle V0 and the TTV of the vehicle V1, and can calculate the proximity degree parameter r using the TTC-TTV map illustrated in FIG. 5.

Figure 6:
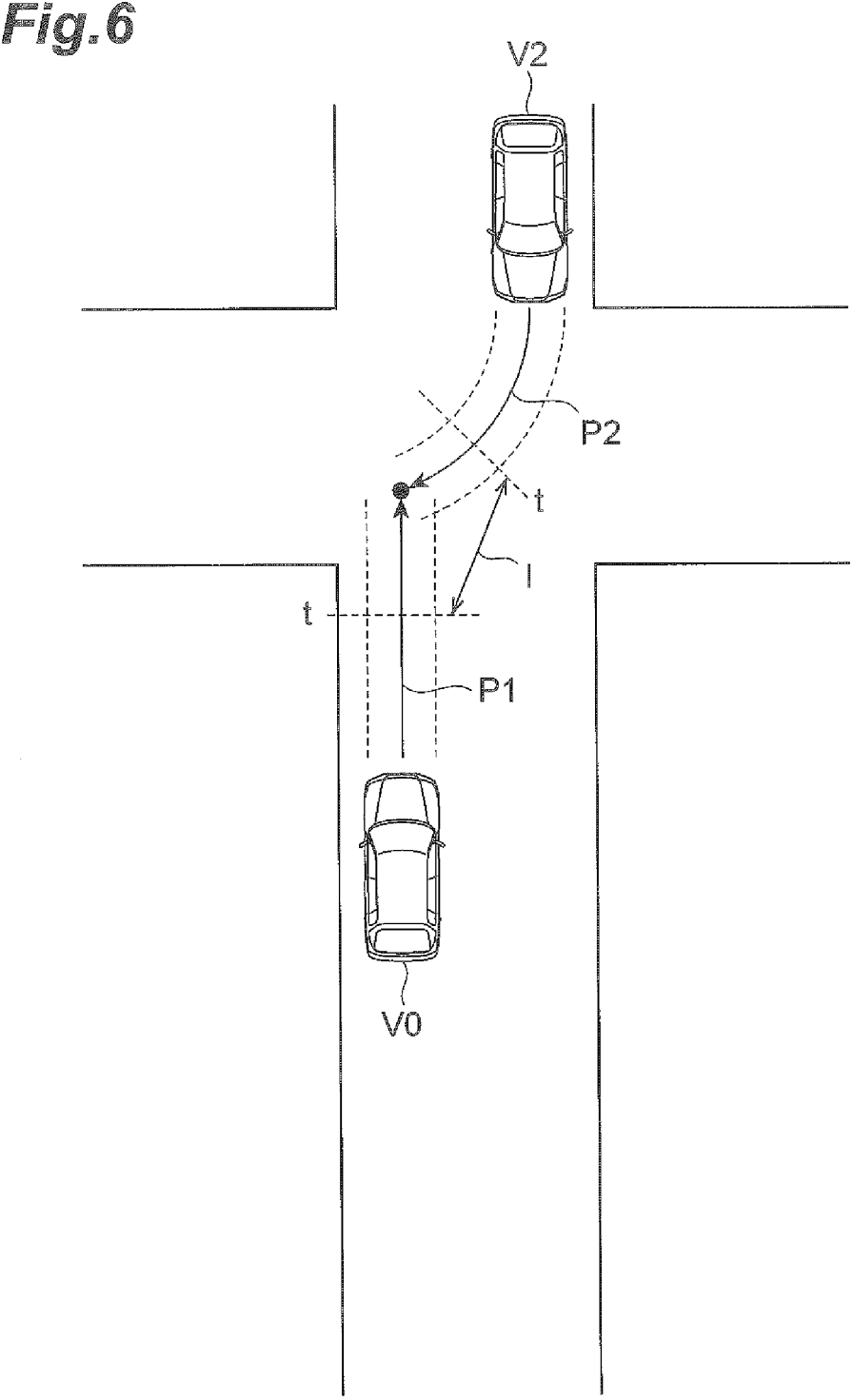
FIG. 6 is a diagram for explaining another example of a method of calculating the proximity degree parameter r.

Next, another method of calculating the proximity degree parameter r will be described. FIG. 6 is a diagram illustrating a scene in which the host vehicle V0 is traveling toward the intersection where a right turning vehicle V2 exists. In this case, the risk level acquisition unit 43 calculates the relative speed parameter v of the vehicle V0 and the right turning vehicle V2 based on the environmental information and the traveling information, and estimates a future traveling path P1 of the vehicle V0 and a future traveling path P2 of the right turning vehicle V2. Furthermore, the risk level acquisition unit 43 calculates a relative distance 1 between the vehicle V0 and the vehicle V2 when the two vehicles most closely approach in the future from the traveling path P1 and the traveling path P2. Then, the risk level acquisition unit 43 calculates the proximity degree parameter r from Formula (2) below.

$$r = v/1 \qquad (2)$$

Figure 7:
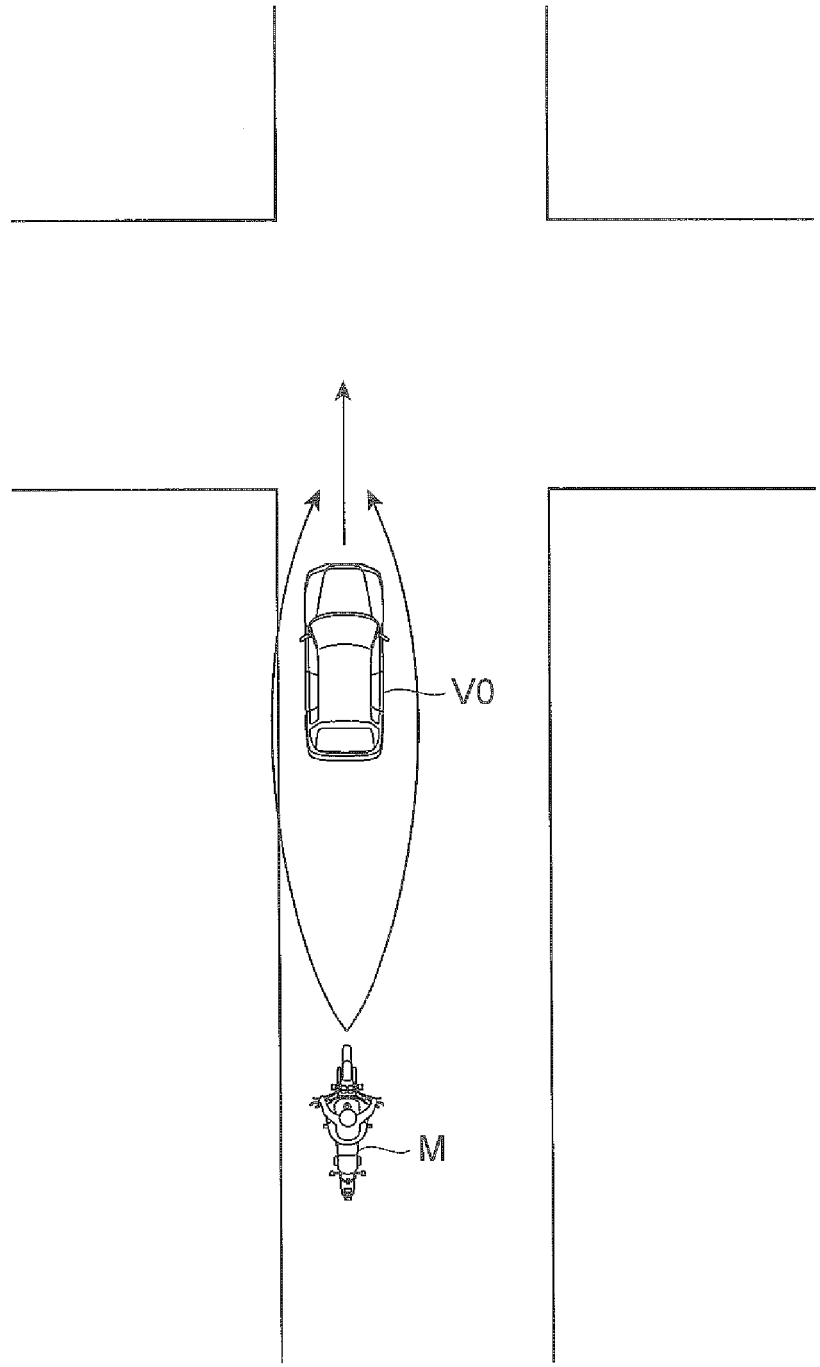
FIG. 7 is a diagram for explaining another example of a method of calculating the proximity degree parameter r.

The method of calculating the proximity degree parameter r using Formula (2) may applied to a scene, as illustrated in FIG. 7, in which a motorcycle M overtakes the vehicle V0. That is, the risk level acquisition unit 43 acquires the relative speed parameter v of the vehicle V0 and the motorcycle M and the distance 1 when the vehicle V0 and the motorcycle M most closely approach each other, and calculates the proximity degree parameter r from Formula (2) above.

The method of calculating the proximity degree parameter r using Formula (2) may applied to a scene, as illustrated in FIG. 8(a), in which a vehicle V3 interrupts in front of the vehicle V0 near the intersection, and a scene, as illustrated in FIG. 8(b), in which the vehicle V0 overtakes a parked vehicle V4. That is, the risk level acquisition unit 43 calculates the relative speed parameter v of the vehicle V0 and the vehicle V3 or the vehicle V4 and the distance 1 when the vehicle V0 most closely approaches the vehicle V3 or the vehicle V4, and then, calculates the proximity degree parameter r from Formula (2) above.

Next, a method of calculating the obstacle parameter k will be described. The obstacle parameter k is a value determined based on an existing position of obstacles. The risk level acquisition unit 43 detects at which of the following positions with respect to the position of the host vehicle V0 as the center the obstacles exist: "right front", "right", "right rear", "rear", "left rear", "left", "left front", and "front", and assigns coefficients k1 to k8 to the obstacles existing at each positions of "right front", "right", "right rear", "rear", "left rear", "left", "left front", and "front". Then, the risk level acquisition unit 43 calculates the obstacle parameter k based on the sum of the coefficients k1 to k8 assigned to the detected obstacles. The coefficients k1 to k8 can be set to any arbitrary values. For example, since there is considered to be a higher possibility of collision in the future with an obstacle existing in front of the host vehicle V0 than an obstacle existing at the rear, the coefficient k8 may be set to a higher value than the coefficient k4.

The method of calculating the obstacle parameter k will be described using specific examples. FIG. 9 is a diagram illustrating a scene in which the vehicle V0 enters an intersection where vehicles V5 to V7 exist. At time t0, as illustrated in FIG. 9(a), the vehicle V0 is traveling before the intersection. In this case, the coefficient k1 is assigned to the vehicle V5 that exists at the right front of the vehicle V0, the coefficient k8 being assigned to the vehicle V6 that exists in front of the vehicle V0. In addition, the coefficient k7 is assigned to the vehicle V7 that exists at the left front of the vehicle V0. Accordingly, the obstacle parameter k at time t0 is k1+k8+k7.

At time t1 after t0, as illustrated in FIG. 9(b), the vehicle V0 is traveling in the intersection. In this case, the coefficient k2 is assigned to the vehicle V5 because it exists at the right of the vehicle V0. In addition, the coefficient k8 is assigned to the vehicle V6 because it exists in front of the vehicle V0. In addition, the coefficient k6 is assigned to the vehicle V7 that exists at the left of the vehicle V0. Accordingly, the obstacle parameter k at time t1 is k2+k8+k6.

At time t2 after t1, as illustrated in FIG. 9(c), the vehicle V0 exits from the intersection far away from the travel lane. In this case, the coefficient k3 is assigned to the vehicle V5 because it exists at the right rear of the vehicle V0, and the coefficient k7 is assigned to the vehicle V6 because it exists at the left front of the vehicle V0. In addition, the coefficient k5 is assigned to the vehicle V7 that exists at the left rear of the vehicle V0. Furthermore, at time t2, there is an impending wall W which is an obstacle in front of the vehicle V0 which is at a position away from the road. Therefore, the coefficient k8 is assigned to the wall W. Accordingly, the obstacle parameter k at time t2 is k3+k7+k5+k8.

In the above-described example, the method of calculating the obstacle parameter k when the vehicle V0 enters the intersection will be described. However, using the same method, it is possible to calculate the obstacle parameter k in a case where the host vehicle is traveling near an intersection or a single road.

In addition, the risk level acquisition unit 43, in a case where the host vehicle travels the intersection, may set the risk level T to be larger than that in the case where the host vehicle is traveling near an intersection or a single road. In addition, the risk level acquisition unit 43, in a case where the host vehicle is traveling near an intersection, may set the risk level T to be larger than that in the case where the host vehicle travels the single road.

The risk level T is calculated by Formula (1) using the parameters d, k, r, and v calculated as in the above-described examples. The control unit 44 notifies the vehicles surrounding the host vehicle of the risk with a different notification level according to the magnitude of the risk level T to call attention. An example of the notification level of the control unit 44 will be described using FIG. 10. In a case where the risk level T is larger than a first threshold value and smaller than a second threshold value which is larger than the first threshold value (risk level "small" in FIG. 10), the control unit 44 determines that the risk affects only a specific vehicle among the vehicles surrounding the host vehicle, or determines that the risk is at a level requiring a defensive posture so as not to be closer (that is, an emergency level is low), and then, notifies the vehicles at rear or the rear side of the risk by causing the brake lamp to blink.

In a case where the risk level T is larger than the second threshold value and equal to or smaller than a third threshold value which is larger than the second threshold value (risk level "medium" in FIG. 10), the control unit 44 determines that the risk affects only limited vehicles among the vehicles surrounding the host vehicle, or determines that the risk is at a level requiring an avoidance (that is, an emergency level is somewhat high), and then, notifies of the risk with respect to the direction where the vehicles on which there may be an influence exist. For example, in a case where the vehicles exists in front or behind, the control unit 44 causes the brake lamp or a hazard lamp to blink. In addition, in a case where the vehicle is an oncoming vehicle, the control unit 44 causes a high beam to blink. In addition, in a case where the vehicle exists on a lane crossing at an intersection, the control unit 44 notifies of the risk by causing revolving light to be turned on or a horn to honk.

In a case where the risk level T is larger than the third threshold value (risk level "large" in FIG. 10), the control unit 44 determines that the risk affects unspecified vehicles, or determines that the risk is at the level of requiring emergency avoidance (that is, an emergency level is extremely high), and then, notifies of the risk with respect to all directions. For example, the control unit 44 notifies the surrounding vehicles of the risk by causing the revolving light to be turned on together with causing the horn to honk. In addition, the control unit 44 may cause the hazard lamp and the brake lamp to blink. Here, the reason for causing both of the hazard lamp and the brake lamp to blink is to prevent confusion with a behavior of causing the hazard lamp to blink for transmitting appreciation to surrounding vehicles. In a case where the risk level T is equal to or smaller than the first threshold value, the control unit 44 does not notify surrounding vehicles of the risk. As described above, as the calculated risk level T increases, a higher notification level is set high.

Figure 11:
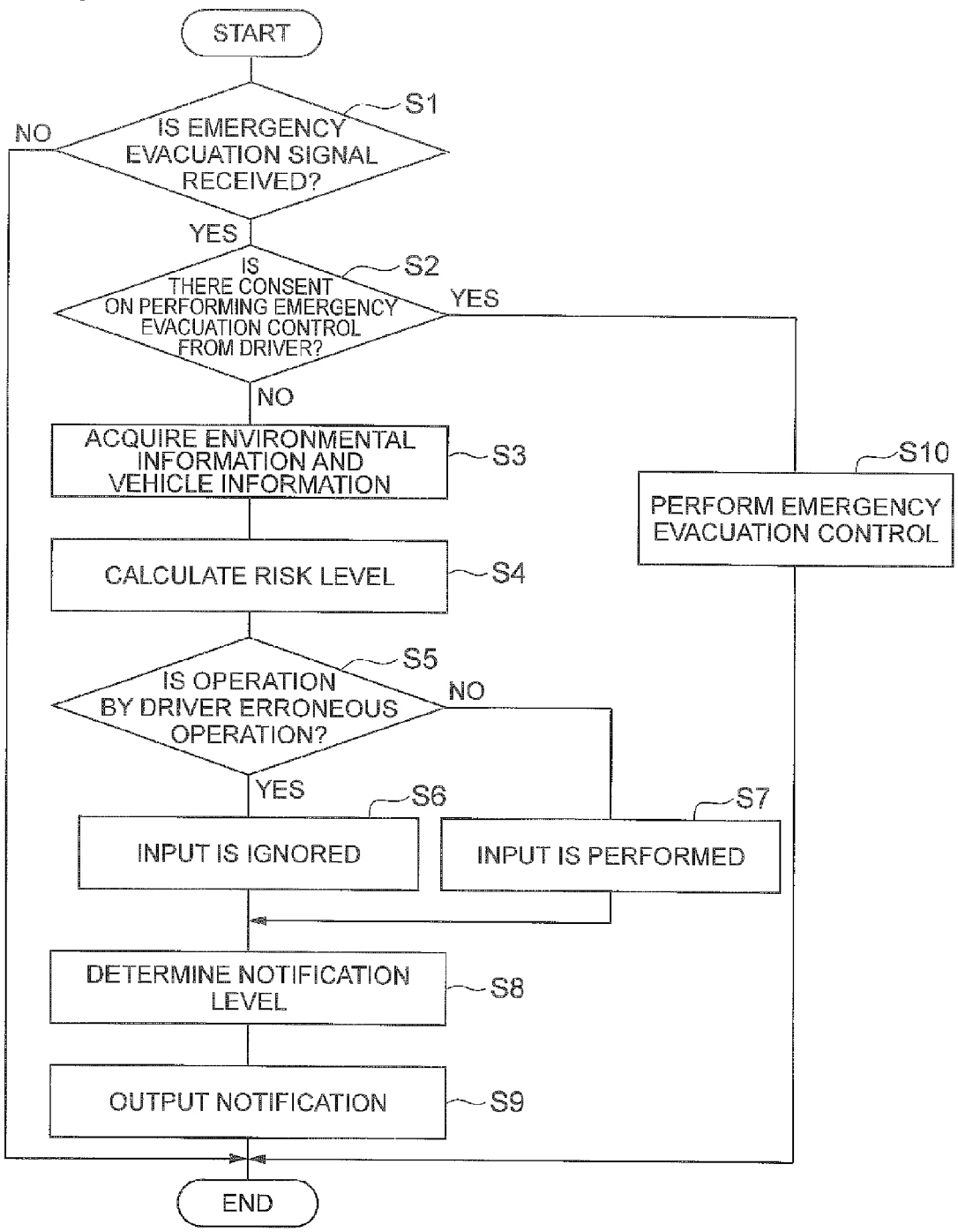
FIG. 11 is flow chart illustrating an operation of a drive assist device in a first embodiment.

Next, the operation of the drive assist device 1 in the present invention will be described. FIG. 11 is flow chart illustrating the operation of the drive assist device 1 in the present embodiment. The processing illustrated in FIG. 11, for example, is repeatedly performed from the timing of power ON of the drive assist device 1 at a predetermined interval.

First, the determination control unit 40 of the drive assist device 1 determines whether or not the emergency evacuation start signal is received from the driver state detection unit 30 (S1). In a case where the emergency evacuation start signal is not received (No in S1), the processing ends. In a case where the emergency evacuation start signal is received (Yes in S1), the consent confirmation unit 41 of the determination control unit 40 inquires of the driver whether or not the emergency evacuation control is permitted to be performed. With respect to the inquiry, in a case where the answer of the consent on performing the emergency evacuation control is obtained from the driver (Yes in S2), the emergency evacuation control is performed (S10) and the processing ends. On the other hand, with respect to the inquiry, in a case where the answer of the consent on performing the emergency evacuation control is not obtained from the driver (No in S2), the determination control unit 40 acquires environmental information and the traveling information from the environmental information acquisition unit 10 and the traveling information acquisition unit 20 (S3). Next, the risk level acquisition unit 43 calculates the parameters d, k, r, and v using the environmental information and the traveling information, and calculates the risk level T from the parameters and the state level D of the driver (S4).

Subsequently, the erroneous operation determination unit 42 acquires on which of an intersection, near an intersection, or a single road the host vehicle is traveling from the environmental information, and determines whether or not the operation of the driver is an erroneous operation using the determination map illustrated in FIG. 3 (S5). In a case where it is determined that the operation of the driver is an erroneous operation (Yes in S5), the input is ignored (S6). That is, the operation of the driver is invalidated. On the other hand, in a case where it is determined that the operation of the driver is not an erroneous operation (No in S5), the input is performed (S7).

Next, the risk level acquisition unit 43 determines the notification level from the risk level T calculated in STEP S4 (S8). Then, the control unit 44 performs the outputting of the notification corresponding to the notification level according to the risk level as illustrated in FIG. 10 (S9). When the control unit 44 performs the outputting of the notification, the series of drive assist processing ends.

In the drive assist device 1 described above, the conditions for performing the preventive drive assist in which the risk for the traveling of the vehicle is avoided is alleviated during the period from the time of receiving the emergency evacuation start signal by the driver state detection unit 30 to the time of receiving the answer of permitting to perform the control by the consent confirmation unit 41, and thus, the preventive drive assist is easily performed. Accordingly, during the period from the time of receiving the emergency evacuation start signal to the time of obtaining the driver's consent, it is possible to prevent the behavior of the vehicle by an erroneous operation by the driver from giving discomfort to the drivers of surrounding vehicles.

Second Embodiment

Next, a second embodiment of the present invention will be described. A drive assist device 1 in the second embodiment has almost the same configuration as the drive assist device 1 in the first embodiment. However, the difference is in the conditions for performing the preventive drive assist and the content of the preventive drive assist determined in the determination control unit 40. Hereinafter, for the sake of easy understanding, the description will be focused on the differences from the drive assist device 1 in the first embodiment and repeated descriptions will be omitted.

In a case where the consciousness level of the driver is diminished, it is considered that the driver's body is relaxed and steering is not possible. In this case, if the vehicle is steered by an external disturbance such as a level unevenness or a cant on the road surface, there is a possibility that the vehicle may leave the road and collide with an obstacle. Therefore, in a case where an external disturbance such as a level unevenness or a cant on the road surface is detected in the state that the steering is not maintained by the driver, the drive assist device 1 in the present invention performs a deceleration control and a steering assist control by the ECB 71 and the EPS 73 as the preventive drive assist.

Figure 12:
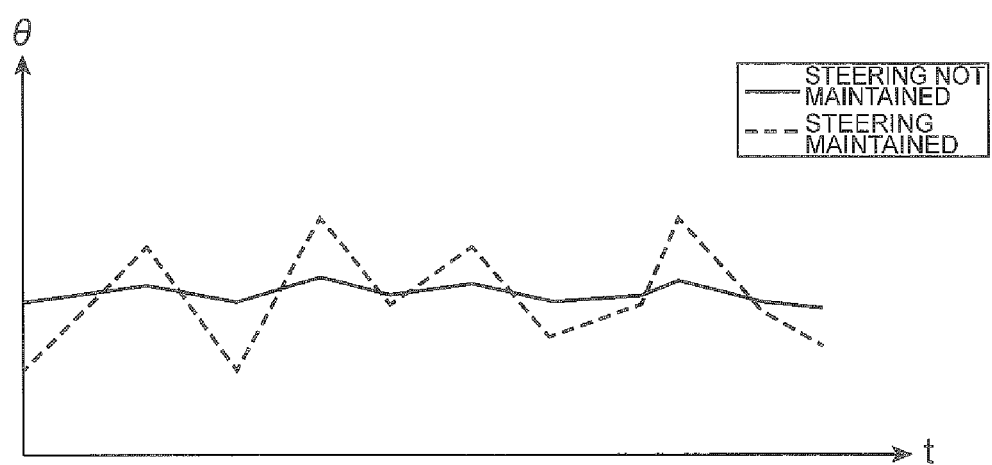
FIG. 12 is a diagram for explaining a method of detecting whether or not a driver is maintaining the steering.

FIG. 12 is a diagram for explaining a method of detecting whether or not a driver is maintaining the steering. The horizontal axis in FIG. 12 indicates the time t and the vertical axis indicates the steering angle (amount of steering) θ. The dashed line in FIG. 12 indicates a steering angle change in a general time series when the driver is in a state of maintaining steering and the solid line indicates a steering angle change in a general time series when the driver is not in a state of steering holding. As illustrated in FIG. 12, generally, in a case where the driver does not maintain the steering, the variation of the steering angle θ is smaller than that in a case where the driver maintains the steering. Therefore, the determination control unit 40 of the drive assist device 1 calculates the variation of the steering angle θ in time series, and in a case where the variation is smaller than a predetermined threshold value (a predetermined amount of steering), it is determined that the driver does not maintain the steering due to diminished consciousness or the like.

FIG. 13(*a*) is a diagram for explaining a method of detecting a level unevenness on the road surface. The horizontal axis in FIG. 13(*a*) indicates the time t and the vertical axis indicates acceleration G of the vehicle in the front-rear direction. The dashed line in FIG. 13(*a*) indicates the acceleration change in the front-rear direction in time series on a flat road surface without level unevenness, and the solid line indicates the acceleration change in the front-rear direction in time series on a road surface with level unevenness. As illustrated in FIG. 13(*a*), if there is a level unevenness on the road surface, the acceleration G increases over a certain time. Accordingly, in a case where a continuing duration of the acceleration exceeding a predetermined threshold value is equal to or shorter than a certain duration, the determination control unit 40 detects the existence of a level unevenness.

FIG. 13(*b*) is a diagram for explaining a method of detecting a cant on the road surface. The horizontal axis in FIG. 13(*b*) indicates the time t and the vertical axis indicates acceleration G of the vehicle in the front-rear direction. The dashed line in FIG. 13(*b*) indicates the acceleration change in the front-rear direction in time series on a road surface without cant, and the solid line indicates the acceleration change in the front-rear direction in time series on a road surface with cant. As illustrated in FIG. 13(*b*), if there is a cant on the road surface, the acceleration increases over a longer time than the case of the level unevenness. Accordingly, in a case where a continuous duration of the acceleration exceeding a predetermined threshold value is longer than a certain duration, the determination control unit 40 detects the existence of a cant. A level unevenness and a cant may be detected based on the lateral acceleration, an amount of change in yaw rate or a change in roll angle. In a case where a level unevenness or a cant is detected, the determination control unit 40 determines that the risk level is high.

In a case where the driver is not in a steering holding state and a level unevenness or a cant is not detected, the determination control unit 40 performs preventive drive assist. The preventive drive assist performed by the determination control unit 40 in a case where there is a level unevenness on the road will be described referring to FIG. 14. In a case where the driver is not in a steering holding state and a level unevenness is detected (that is, in a case where the acceleration G of the vehicle in the front and rear direction is equal to or larger than the threshold value), as illustrated in FIG. 14(*a*), the determination control unit 40 sets ON the erroneous input occurrence flag F. The determination control unit 40, if the erroneous input occurrence flag F is set to ON, controls the EPS 73 and provides a torque so as to cancel the erroneous input (steering) caused by the level unevenness. In this way, the host vehicle is prevented from leaving. Furthermore, the determination control unit 40 changes the gear ratio by the variable gear ratio steering (VGRS) and provides the torque T1 so as not to hurt the driver by the rotation of the steering by the EPS 73, and decreases the amount of the steering.

In addition, as illustrated in FIG. 14(*b*), in a case where the erroneous input occurrence flag F is set to ON, the determination control unit 40 controls the ECB 71 and causes the ECB 71 to start the deceleration control earlier than the ordinary deceleration control illustrated by the dashed line. In this way, the collision of the host vehicle with the obstacle is prevented.

Figure 15:
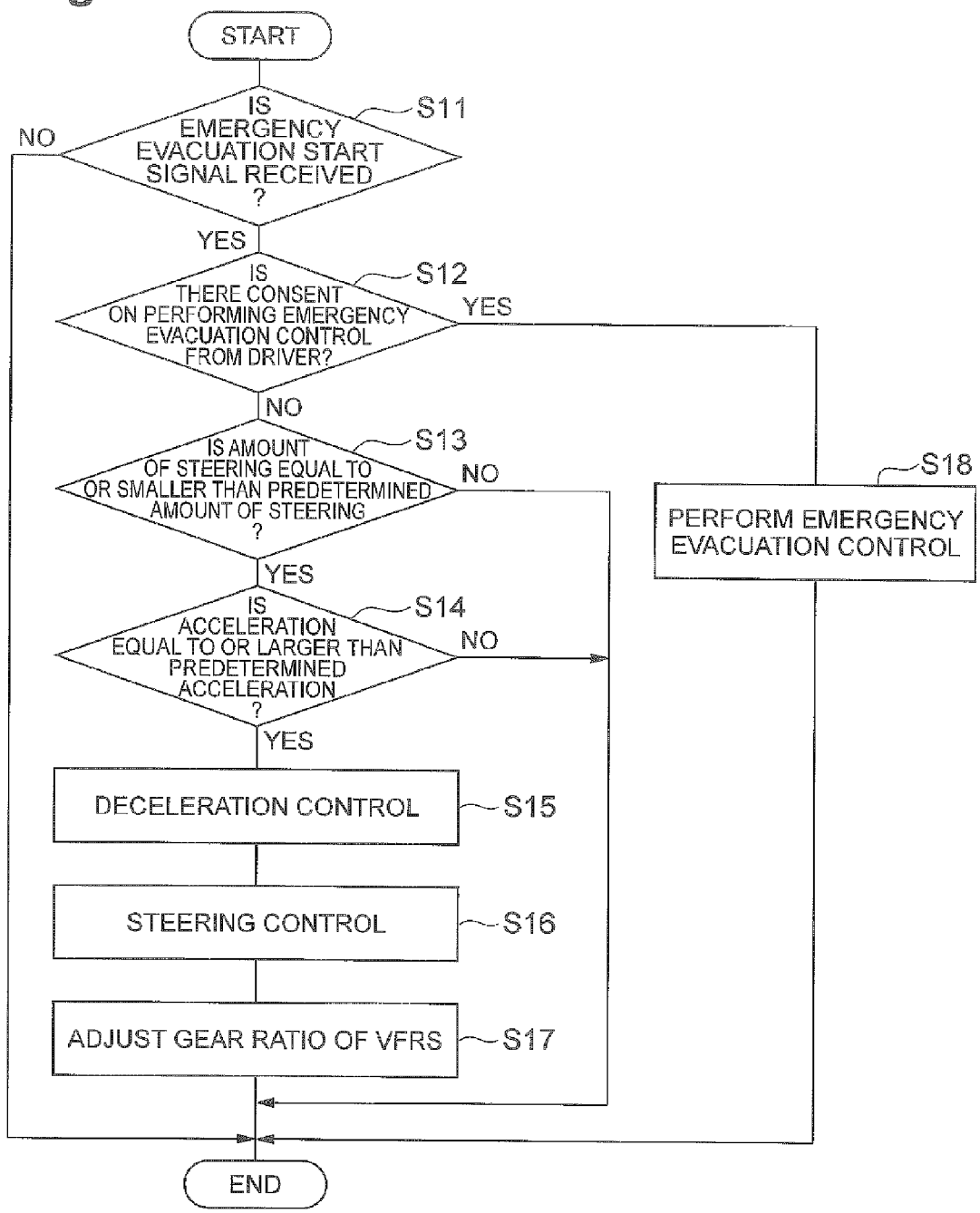
FIG. 15 is a flow chart illustrating an operation of a drive assist device in a second embodiment.

Next, the operation of the drive assist device 1 in the present embodiment will be described. FIG. 15 is a flow chart illustrating the operation of the drive assist device 1 in the present embodiment. The processing illustrated in FIG. 15, for example, is repeatedly performed from the timing of power ON of the drive assist device 1 at a predetermined interval.

First, the determination control unit 40 of the drive assist device 1 determines whether or not the emergency evacuation start signal is received from the driver state detection unit 30 (S11). In a case where the emergency evacuation start signal is not received (No in S11), the processing ends. In a case where the emergency evacuation start signal is received (Yes in S11), the consent confirmation unit 41 of the determination control unit 40 inquires of the driver whether or not the emergency evacuation control is permitted to be performed. With respect to the inquiry, in a case where the answer of the consent on performing the emergency evacuation control is obtained from the driver (Yes in S12), the emergency evacuation control is performed (S18) and the processing ends.

On the other hand, with respect to the inquiry, in a case where the reply of the consent on performing the emergency evacuation control is not obtained from the driver (No in S12), the determination control unit 40 determines whether the amount of steering by the driver's steering is equal to or smaller than a predetermined amount of steering (S13). In a case where the amount of steering by the driver's steering is larger than the predetermined amount of steering, the processing ends (No in S13). In a case where the amount of steering by the driver's steering is equal to smaller than the predetermined amount of steering (Yes in S13), the determination control unit 40 determines whether the acceleration of the vehicle is equal to or larger than a predetermined acceleration (S14).

In a case where the acceleration of the vehicle is not equal to or larger than the predetermined acceleration (No in S14), the processing ends. On the other hand, in a case where the acceleration of the vehicle is equal to or larger than the predetermined acceleration (Yes in S14), the determination control unit 40 performs the deceleration control (S15) by the ECB 71, the steering control (S16) by the EPS 73, and the adjustment of the gear ratio (S17) by the VFRS. When the deceleration control (S15) by the ECB 71, the steering control (S16) by the EPS 73, and the adjustment of the gear ratio (S17) by the VFRS are performed, the determination control unit 40 ends the series of drive assist processing.

As described above, in the drive assist device 1 in the present embodiment, in a case where the amount of steering is small and the amount of change in lateral acceleration and the yaw rate of the vehicle is large, the risk level is set to be high. Therefore, it is possible to appropriately set the risk level.

Third Embodiment

Next, a third embodiment of the present invention will be described. A drive assist device 1 in the third embodiment has almost the same configuration as the drive assist devices 1 in the first embodiment and the second embodiment. However, the difference is in the conditions for performing the preventive drive assist and the content of the preventive drive assist determined in the determination control unit 40. Hereinafter, for the sake of easy understanding, the description will be focused on the differences from the drive assist device 1 in the first embodiment and the second embodiment, and repeated descriptions will be omitted.

The drive assist device 1 in the present embodiment, if there is a possibility that a sideslip of the vehicle may occur, may easily cause the VSC 64 to perform the sideslip prevention control as the preventive drive assist. First, an ordinary operation of the VSC 64 will be described. The VSC 64 is a device that detects the sideslip state of the vehicle and prevents the sideslip state by controlling the braking force and the driving force of each wheel. The VSC 64 performs the control when the vehicle speed V, steering angle θ, the acceleration G, and the yaw rate γ satisfy the control starting condition indicated by Formula (3) below. When the VSC 64 performs the control, an input of a brake hydraulic pressure P which is larger than a predetermined hydraulic pressure P_th is ignored, and an input of a throttle opening P which is larger than a predetermined throttle opening A_th is ignored. That is, the VSC 64 prevents the sideslip of the vehicle by ignoring the driving operation of a sudden braking or sudden acceleration by the driver.

$$(aV+b\theta)-(cG+d\gamma) \geq \text{VSC\_ON\_th} \quad (3)$$

Here, VSC_ON_th: a predetermined threshold value set in advance.

The determination control unit 40 of the drive assist device 1 changes the above Formula (3) to Formula (4) during a waiting period. That is, the determination control unit 40 alleviates the control starting condition of the VSC 64.

$$(aV+b\theta)-(cG+d\gamma) \geq \text{R\_VSC\_ON\_th} \quad (4)$$

Here,

R_VSC_ON_th: a predetermined threshold value set in advance (R_VSC_ON_th<VSC_ON_th)

In addition, in a case where the control starting condition of the VSC 64 indicated in Formula (4) is satisfied, in the determination control unit 40, the input of the brake hydraulic pressure P which is larger than the predetermined hydraulic pressure R_P_th is ignored, and the input of the throttle opening P which is larger than a predetermined throttle opening R_A_th is ignored. Here, the value of the hydraulic pressure R_P_th is smaller value than that of the predetermined hydraulic pressure P_th, and the value of the throttle opening R_A_th is smaller than that of the predetermined throttle opening A_th. That is, the VSC 64 can more reliably prevent the sideslip of the vehicle than ordinarily by performing the control of ignoring the driving operation of a sudden braking or sudden acceleration by the driver.

Fourth Embodiment

Next, a fourth embodiment of the present invention will be described. A drive assist device 1 in the fourth embodiment has almost the same configuration as the drive assist devices 1 in the first embodiment to the third embodiment. However, the difference is in the conditions for performing the preventive drive assist and the content of the preventive drive assist determined in the determination control unit 40. Hereinafter, for the sake of easy understanding, the description will be focused on the differences from the drive assist device 1 in the first embodiment to the third embodiment, and repeated descriptions will be omitted.

In the drive assist device 1 in the present embodiment, the erroneous operation determination unit 42 determines whether or not the starting operation or the release operation by the driver for the drive assist by the drive assist unit 60 is an erroneous operation. In a case where it is determined that the starting operation or the release operation of the drive assist unit 60 by the driver is an erroneous operation by the erroneous operation determination unit 42, the control unit 44 invalidates the starting operation or the release operation of the drive assist unit 60 by the driver. Hereinafter, the operation of the determination control unit 40 will be described using a specific drive assist.

The erroneous operation determination unit 42, in a case where the driver performs turning ON of the ACC 61 during a waiting period (starting operation), determines that the starting operation is an erroneous operation. That is because, when stopping the host vehicle is necessary due to diminished consciousness of the driver, if the ACC 61 is operated, when the preceding vehicle accelerates or departs from the lane, the host vehicle follows the preceding vehicle or the set vehicle speed increases, and then the host vehicle also accelerates which is inappropriate.

Figure 16:
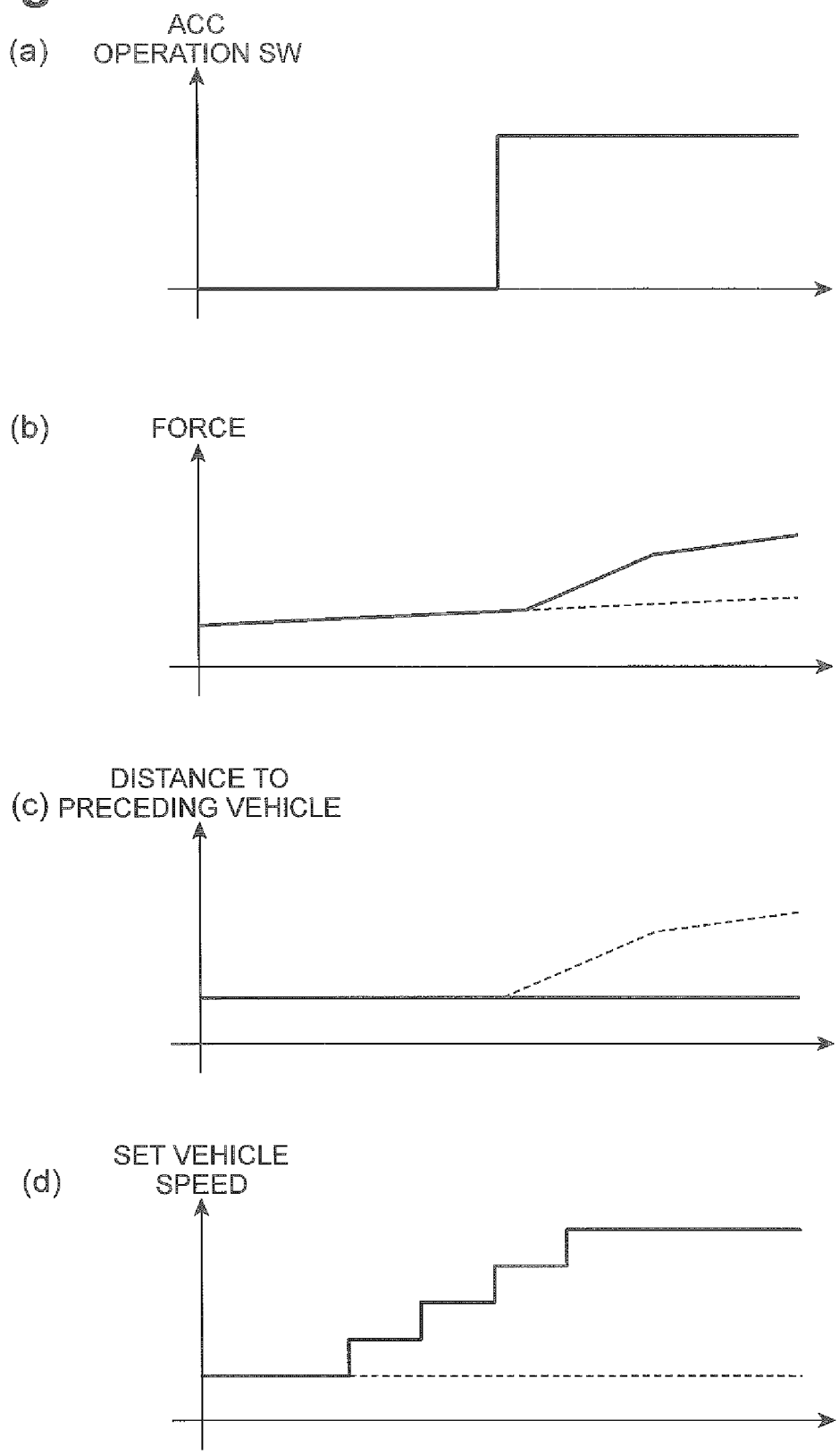
FIG. 16 is a diagram illustrating a trend of driving force, a distance to a preceding vehicle, and a set vehicle speed of a host vehicle in a case where a starting operation of an ACC is recognized, and illustrating a trend of driving force, a distance to a preceding vehicle, and a set vehicle speed of the host vehicle in a case where the starting operation of the ACC is invalidated.

FIG. 16(*a*) illustrates the timing when an operation switch of the ACC 61 is turned ON. FIG. 16(*b*)B is, in a case where the starting operation of the ACC 61 is performed when the preceding vehicle accelerates, a diagram illustrating a trend of driving force of the host vehicle in a case where the starting operation is recognized and a trend of driving force of the host vehicle in a case where the starting operation is invalidated. In FIG. 16(*b*), the trend of driving force of the host vehicle in a case where the starting operation of the ACC 61 is recognized is illustrated by a solid line and the trend of driving force of the host vehicle in a case where the ACC starting operation is invalidated is illustrated by a dashed line. As illustrated in FIG. 16(*b*), if the starting operation of the ACC 61 is recognized, a constant speed traveling control or a vehicle-to-vehicle distance control is performed and the driving force increases. On the other hand, if the starting operation of the ACC 61 is invalidated, the driving force is kept constant.

FIG. 16(*c*) is, in a case where the ACC starting operation is performed when the preceding vehicle accelerates, a diagram illustrating a trend of vehicle-to-vehicle distance to the preceding vehicle in a case where the starting operation is recognized and a trend of vehicle-to-vehicle distance to the preceding vehicle in a case where the starting operation is invalidated. In FIG. 16(*c*), the trend of vehicle-to-vehicle distance of the host vehicle to the preceding vehicle in a case where the ACC starting operation is recognized is illustrated by a solid line, and the trend of vehicle-to-vehicle distance of the host vehicle to the preceding vehicle in a case where the ACC starting operation is invalidated is illustrated by a dashed line. As illustrated in FIG. 16(c), if the starting operation is recognized, a vehicle-to-vehicle distance control is performed and the vehicle-to-vehicle distance to the preceding vehicle is maintained. On the other hand, if the ACC starting operation is invalidated, the host vehicle decelerates and the vehicle-to-vehicle distance to the preceding vehicle increases. In addition, in a case where the constant speed traveling control is performed by the ACC starting operation as well, the host vehicle accelerates and the vehicle-to-vehicle distance to the preceding vehicle can be decreased.

FIG. 16D is, in a case where the ACC starting operation is performed, a diagram illustrating a trend of the driving force of the host vehicle in a case where the starting operation is recognized and a trend of the driving force of the host vehicle in a case where the starting operation is invalidated. In FIG. 16(d), the trend of set vehicle speed of the host vehicle in a case where the ACC starting operation is recognized is illustrated by a solid line and the trend of set vehicle speed of the host vehicle in a case where the ACC starting operation is invalidated is illustrated by a dashed line. As illustrated in FIG. 16(d), if the ACC starting operation is recognized, the constant speed traveling control device or the vehicle-to-vehicle distance control is performed and the set vehicle speed increases level unevennesswise. On the other hand, if the ACC starting operation is invalidated, the set vehicle speed is kept constant.

The erroneous operation determination unit 42, in a case where the driver operates to turn ON the LKA 63 during a waiting period (starting operation), determines that the starting operation is an erroneous operation. That is because, when it is necessary to stop the host vehicle due to diminished consciousness of the driver, if the LKA 63 is operated, the host vehicle continues to travel which is inappropriate.

Figure 17:
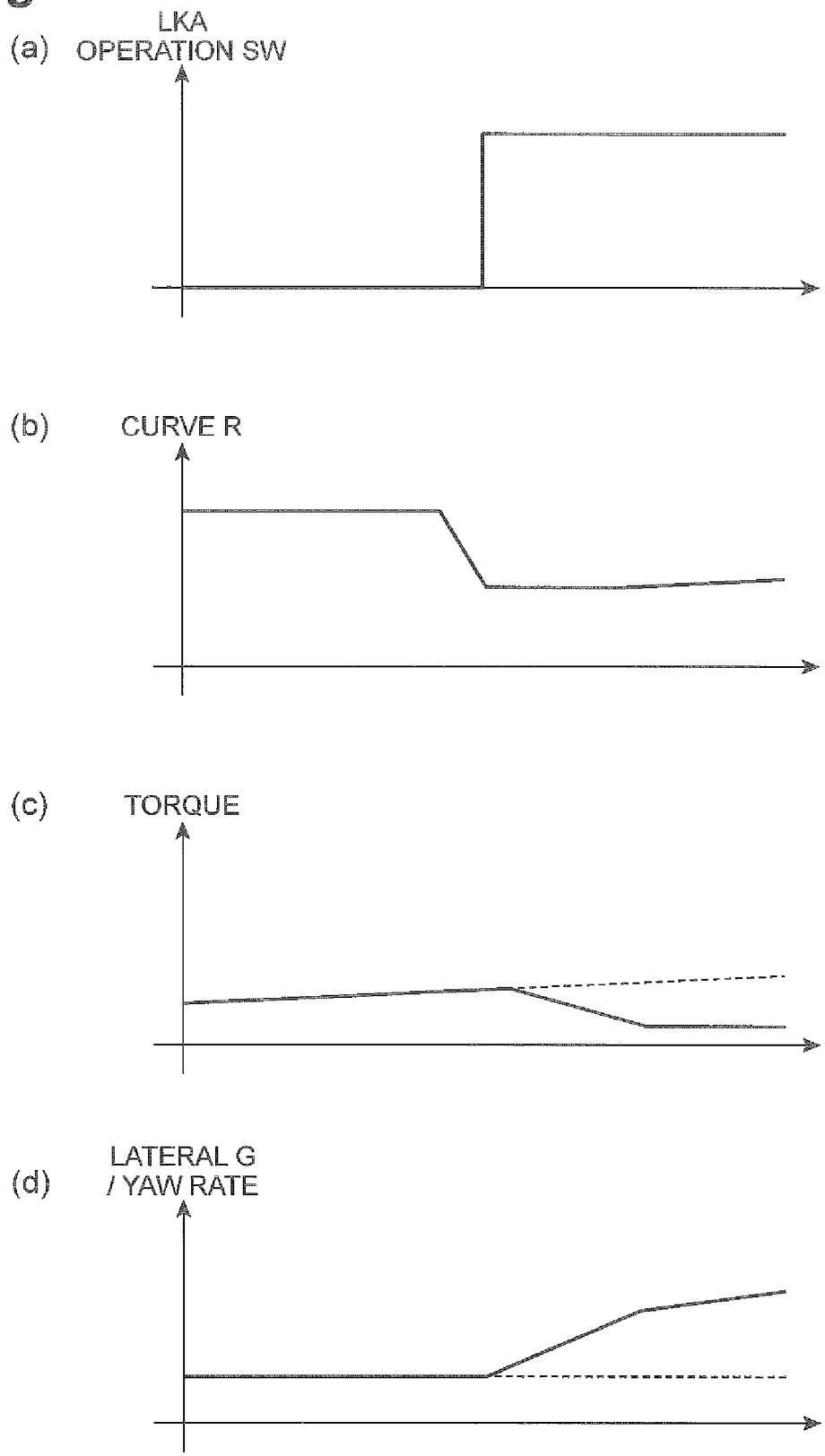
FIG. 17 is a diagram illustrating a trend of a torque and a yaw rate of the host vehicle in a case where a starting operation of an LKA is recognized, and illustrating a trend of a torque and a yaw rate of the host vehicle in a case where the starting operation of the LKA is invalidated.

FIG. 17(a) illustrates the timing when an operation switch of the LKA 63 is turned ON. FIG. 17(b) illustrates a change in radius of a curve. FIG. 17(c) is, in a case where the starting operation of the LKA 63 is performed, a diagram illustrating a trend of a torque of the host vehicle in a case where the starting operation is recognized and a trend of the torque of the host vehicle in a case where the starting operation is invalidated. In FIG. 17(c), the trend of the torque of the host vehicle in a case where the starting operation of the LKA 63 is recognized is illustrated by a solid line and the trend of the torque of the host vehicle in a case where the LKA starting operation is invalidated is illustrated by a dashed line. As illustrated in FIG. 17(b), if the starting operation of the LKA 63 is recognized, the applied torque decreases. On the other hand, if the LKA starting operation is invalidated, the applied torque is kept constant.

FIG. 17(d) is, in a case where the starting operation of the LKA 63 is performed, a diagram illustrating a trend of a yaw rate of the host vehicle in a case where the LKA starting operation is recognized and a trend of the yaw rate of the host vehicle in a case where the LKA starting operation is invalidated. In FIG. 17(d), the trend of the yaw rate of the host vehicle in a case where the starting operation of the LKA 63 is recognized is illustrated by a solid line, and the trend of the yaw rate of the host vehicle in a case where the LKA starting operation is invalidated is illustrated by a dashed line. As illustrated in FIG. 17(d), if the starting operation of the LKA 63 is recognized, a lane keeping assist control is performed and the yaw rate increases. On the other hand, if the LKA starting operation is invalidated, since the lane keeping assist control is not performed, the yaw rate is kept constant.

In addition, the erroneous operation determination unit 42, in a case where the driver performs turning OFF of the VSC 64 (release operation) during a waiting period, determines that the release operation is an erroneous operation. That is because, in a case where there is a possibility of sideslip of the host vehicle due to diminished consciousness of the driver, the releasing of the VSC 64 is inappropriate.

FIG. 18(a) illustrates the timing when an operation switch of the VSC 64 is turned OFF. FIG. 18(b) illustrates a change in radius of a curve. FIG. 18(c) is, in a case where the starting operation of the VSC 64 is performed, a diagram illustrating a trend of a lateral acceleration of the host vehicle in a case where the release operation is recognized and a trend of the lateral acceleration of the host vehicle in a case where the starting operation is invalidated. In FIG. 18(c), the trend of the lateral acceleration of the host vehicle in a case where the release operation of the VSC 64 is recognized is illustrated by a solid line and the trend of the lateral acceleration of the host vehicle in a case where the release operation of the VSC 64 is invalidated is illustrated by a dashed line. As illustrated in FIG. 18(c), if the release operation of the VSC 64 is recognized and the sideslip prevention control is stopped by the VSC 64, the lateral acceleration increases. On the other hand, if the release operation of the VSC 64 is invalidated, the sideslip prevention control is performed and the increase of the lateral acceleration is suppressed.

FIG. 18(d) is, in a case where the release operation of the VSC 64 is performed, a diagram illustrating a trend of a yaw rate of the host vehicle in a case where the release operation is recognized and a trend of the yaw rate of the host vehicle in a case where release operation is invalidated. In FIG. 18(d), the trend of the yaw rate of the host vehicle in a case where the starting operation of the VSC 64 is recognized is illustrated by a solid line, and the trend of the yaw rate of the host vehicle in a case where the VSC release operation is invalidated is illustrated by a dashed line. As illustrated in FIG. 18(d), if the release operation of the VSC 64 is recognized and the sideslip prevention control by the VSC 64 is stopped, the yaw rate increases. On the other hand, if the release operation of the VSC 64 is invalidated, the sideslip prevention control is performed and the increase of the yaw rate is suppressed.

In addition, the erroneous operation determination unit 42, in a case where the driver operates to turn OFF the PCS 62 (release operation) during a waist time, determines that the release operation is an erroneous operation. That is because, there is a possibility of the host vehicle colliding with an obstacle such a case as decelerating of a preceding vehicle or entering of another vehicle and, thus, releasing the PCS 62 is inappropriate at the time of diminished consciousness of the driver.

FIG. 19(a) illustrates the timing when an operation switch of the PCS 62 is turned OFF. FIG. 19(b) is, in a case where the release operation of the PCS 62 is performed, a diagram illustrating a trend of a TTC with respect to the preceding vehicle in a case where the release operation is recognized and a trend of the TTC with respect to the preceding vehicle in a case where the release operation is invalidated. In FIG. 19(b), the trend of the TTC with respect to the preceding vehicle in a case where the release operation of the PCS 62 is recognized is illustrated by a solid line and a trend of TTC with respect to the preceding vehicle in a case where the release operation of the PCS 62 is invalidated is illustrated by a dashed line. As illustrated in FIG. 19(b), if the release operation of the PCS 62 is recognized and the collision avoidance assist is stopped by the PCS 62, the TTC with respect to the preceding vehicle decreases. On the other hand, if the release operation of the PCS 62 is invalidated, the collision avoidance assist is performed and the decrease of the TTC with respect to the preceding vehicle is suppressed.

FIG. 19(c) is, in a case where the release operation of the PCS 62 is performed, a diagram illustrating a trend of a vehicle-to-vehicle distance to the preceding vehicle in a case where the release operation is recognized and a trend of the vehicle-to-vehicle distance to the preceding vehicle in a case where release operation is invalidated. In FIG. 18(c), the trend of the vehicle-to-vehicle distance to the preceding vehicle in a case where the release operation of the PCS 62 is recognized is illustrated by a solid line, and the trend of the vehicle-to-vehicle distance to the preceding vehicle in a case where the release operation of the PCS 62 is invalidated is illustrated by a dashed line. As illustrated in FIG. 18(c), if the release operation of the PCS 62 is recognized and the collision avoidance assist by the PCS 62 is stopped, the vehicle-to-vehicle distance to the preceding vehicle decreases. On the other hand, if the release operation of the PCS 62 is invalidated, the collision avoidance assist is performed and the decrease of the vehicle-to-vehicle distance to the preceding vehicle is suppressed.

According to the drive assist device described above, since it is determined whether or not the starting operation or the release operation by the driver for the drive assist is an erroneous operation, it is possible to detect the dangerous operation or the release operation for the drive assist can be detected. In addition, in a case where it is determined that the starting operation or the release operation by the driver for the drive assist by the drive assist unit 60 is an erroneous operation, the control unit 44 invalidates the starting operation or the release operation by the driver for the drive assist. For this reason, according to the drive assist device, it is possible to prevent the dangerous operation or the release operation for the drive assist from being performed.

The preferred embodiments of the present invention are described as above. However, the present invention is not limited to the embodiments described above. For example, in first to fourth embodiments, the determination control unit 40 includes both of the erroneous operation determination unit 42 and the risk level acquisition unit 43, however, may include any one of them.

In addition, the drive assist device 1 may use a collision avoidance assist device that has the same function as the PCS 62 instead of the PCS 62, and may use a lane keeping assist device that has the same function as the LKA 63 instead of the LKA 63. Furthermore, the drive assist device 1 may use a horizontal slip prevention control device that has the same function as the VSC 64 instead of the VSC 64. The drive assist unit 60 may include drive assist devices that are different from the ACC 61, the PCS 62, the LKA 63, and the VSC 64. For example, the drive assist unit 60 may include a lane departure warning assist device, and the control unit 44 may invalidate the driver's starting operation or the release operation of the lane departure warning assist device.

REFERENCE SIGNS LIST

1: drive assist device,
10: environmental information acquisition unit
20: traveling information acquisition unit
30: driver state detection unit
31: physiological measurement device
32: gaze and face direction measurement device
33: switch
40: determination control unit
41: consent confirmation unit
42: erroneous operation determination unit
43: risk level acquisition unit
44: control unit
50: drive assist HMI
60: drive assist unit
70: actuator
80: drive recorder
90: notification unit

The invention claimed is:

1. A drive assist device comprising:
a detector configured to output a control start signal to initiate an emergency evacuation control of a vehicle; and
a controller configured to:
perform a collision avoidance function by calculating a time (TTC) that the vehicle will take to reach an object, and performing the collision avoidance function based on a comparison between the calculated time (TTC) and a predetermined time interval;
inquire of a driver, after receiving the control start signal from the detector, whether the driver consents the emergency evacuation control, and receive a reply permitting performing of the emergency evacuation control from the driver; and
perform the emergency evacuation control in response to the receiving the reply permitting the performing of the emergency evacuation control from the driver,
wherein the controller is further configured to, during a period from a time of receiving the control start signal from the detector to a time of receiving the reply permitting the performing of the emergency evacuation control from the driver by the controller, activate a preventive drive assist function configured to prevent an erroneous operation of the vehicle, and increase a length of the predetermined time interval.

2. The drive assist device according to claim 1, further comprising one or more sensors configured to sense traveling information of the vehicle and to sense environmental information regarding an environment surrounding the vehicle,
wherein the controller is further configured to:
acquire the traveling information of the vehicle and the environmental information regarding the environment surrounding the vehicle from the one or more sensors;
determine a risk level that the vehicle collides with an obstacle base on at least one of the traveling information and the environmental information; and
adjust the preventive drive assist function based on the risk level.

3. The drive assist device according to claim 2,
wherein the controller is further configured to continually adjust the preventive drive assist function as the risk level increases.

4. The drive assist device according to claim 2,
wherein the controller is further configured to increase the risk level in response to the vehicle entering an intersection.

5. The drive assist device according to claim 2,
wherein the controller is further configured to increase the risk level in response to the vehicle coming within a predetermined distance from an intersection.

6. The drive assist device according to claim 2,
wherein the controller is further configured to increase the risk level in response to:
a steering amount of a steering wheel by the driver being equal to or smaller than a predetermined steering amount, and
a lateral acceleration of the vehicle being equal to or larger than a predetermined lateral acceleration or an amount of change in yaw rate being equal to higher than a predetermined amount of change in yaw rate.

7. The drive assist device according to claim 1,
wherein the detector comprises a switch operable by the driver.

8. The drive assist device according claim 1, wherein the controller is further configured to:
determine that a driving operation by the driver is an erroneous operation, and
in response to determining that the driving operation by the driver is an erroneous operation, adjust the preventive drive assist function.

9. The drive assist device according claim 8,
wherein the controller is further configured to determine that a driving operation wherein a variation of a steering angle of the driver's steering over time is equal to or larger than a predetermined variation of the steering angle over time is an erroneous operation.

10. The drive assist device according claim 8,
wherein the controller is further configured to determine that a driving operation wherein a variation of a throttle opening by the driver over time is equal to or larger than a predetermined variation of a throttle opening over time is an erroneous operation.

11. The drive assist device according to claim 8,
wherein the controller is further configured to determine that a starting operation of the preventive drive assist by the driver is an erroneous operation.

12. The drive assist device according to claim 8,
wherein the controller is further configured to determine that a release operation of the preventive drive assist by the driver is an erroneous operation.

* * * * *